(12) United States Patent
Wu et al.

(10) Patent No.: US 12,125,210 B2
(45) Date of Patent: Oct. 22, 2024

(54) VIDEO IMAGE PROCESSING METHOD AND APPARATUS

(71) Applicant: HUAWEI TECHNOLOGIES CO., LTD., Shenzhen (CN)

(72) Inventors: Yong Wu, Shenzhen (CN); Houqiang Zhao, Hangzhou (CN); Wei Song, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 187 days.

(21) Appl. No.: 17/680,889

(22) Filed: Feb. 25, 2022

(65) Prior Publication Data
US 2022/0270343 A1 Aug. 25, 2022

Related U.S. Application Data

(63) Continuation of application No. PCT/CN2020/087634, filed on Apr. 28, 2020.

(30) Foreign Application Priority Data

Aug. 31, 2019 (CN) .......................... 201910819774.X

(51) Int. Cl.
G06T 7/11 (2017.01)
G06T 7/136 (2017.01)
(Continued)

(52) U.S. Cl.
CPC ................ G06T 7/11 (2017.01); G06T 7/136 (2017.01); G06V 20/40 (2022.01); G06V 40/10 (2022.01);
(Continued)

(58) Field of Classification Search
CPC . G06T 7/11; G06T 7/136; G06T 2207/10016; G06T 2207/20132;
(Continued)

(56) References Cited

U.S. PATENT DOCUMENTS 10,104,338 B2    10/2018 Goesnar
2018/0063482 A1*  3/2018 Goesnar ................. H04N 23/58
2019/0266428 A1   8/2019 Karsh et al.

FOREIGN PATENT DOCUMENTS

CN    102611872 A    7/2012
CN    105659286 A    6/2016
(Continued)

Primary Examiner — Girumsew Wendmagegn
(74) Attorney, Agent, or Firm — Rimon PC

(57) ABSTRACT

Embodiments of this application disclose a video image processing method and apparatus. A specific solution is as follows: obtaining identity information and location information of each subject in an $i^{th}$ video image frame; determining M main subjects from the $i^{th}$ video image frame based on identity information of subjects in N video image frames before the $i^{th}$ video image frame, where the identity information of the subjects in the N video image frames includes identity information of the M main subjects; cropping the $i^{th}$ video image frame based on location information of the main subjects, where a cropped $i^{th}$ video image frame includes the M main subjects; and scaling down or scaling up the cropped $i^{th}$ video image frame, so that a display displays the cropped $i^{th}$ video image frame based on a preset display specification.

17 Claims, 23 Drawing Sheets

(51) Int. Cl.
    *G06V 20/40*          (2022.01)
    *G06V 40/10*          (2022.01)
    *G06V 40/20*          (2022.01)

(52) U.S. Cl.
    CPC .... *G06V 40/20* (2022.01); *G06T 2207/10016* (2013.01); *G06T 2207/20132* (2013.01)

(58) Field of Classification Search
    CPC ....... G06T 2200/24; G06T 2207/20084; G06T 2207/30196; G06T 7/194; G06V 20/40; G06V 40/10; G06V 40/20; G06V 10/25; H04N 7/14; H04N 7/141
    See application file for complete search history.

(56) References Cited

FOREIGN PATENT DOCUMENTS

| | | |
|---|---|---|
| CN | 109360183 A | 2/2019 |
| CN | 110072055 A | 7/2019 |
| CN | 110111136 A | 8/2019 |
| CN | 110148157 A | 8/2019 |

\* cited by examiner

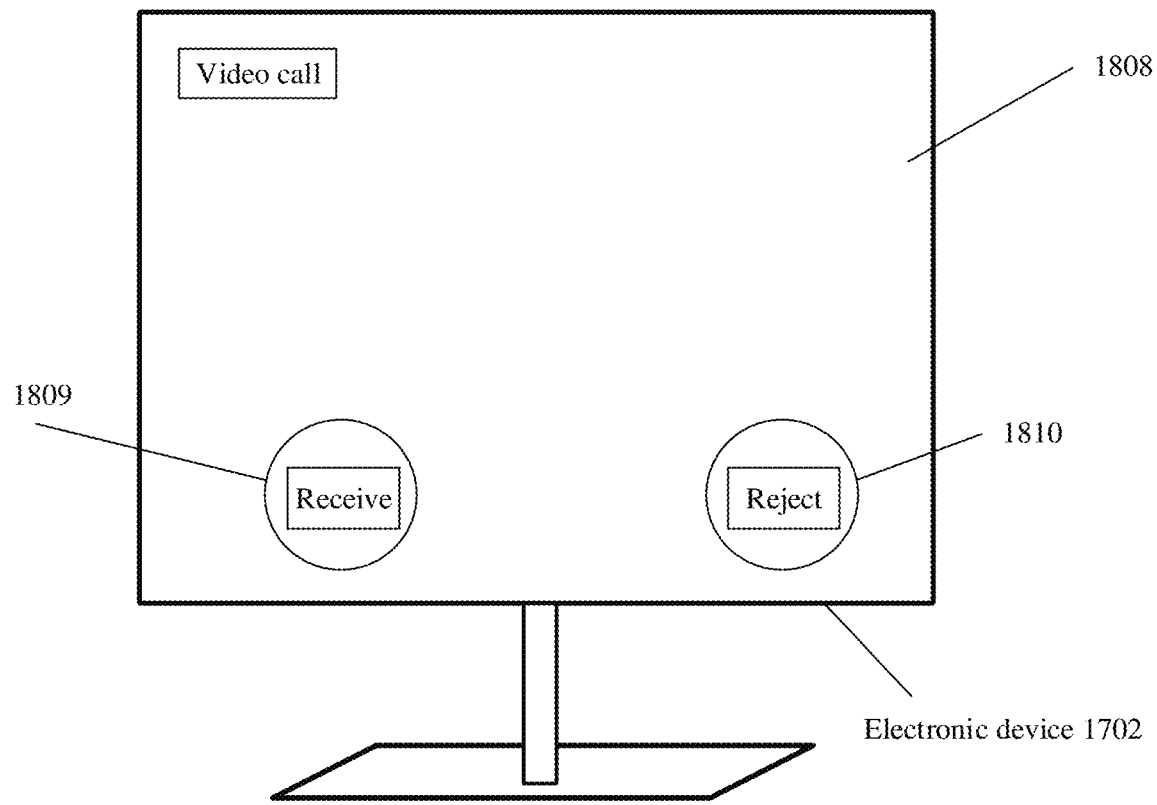
FIG. 18C
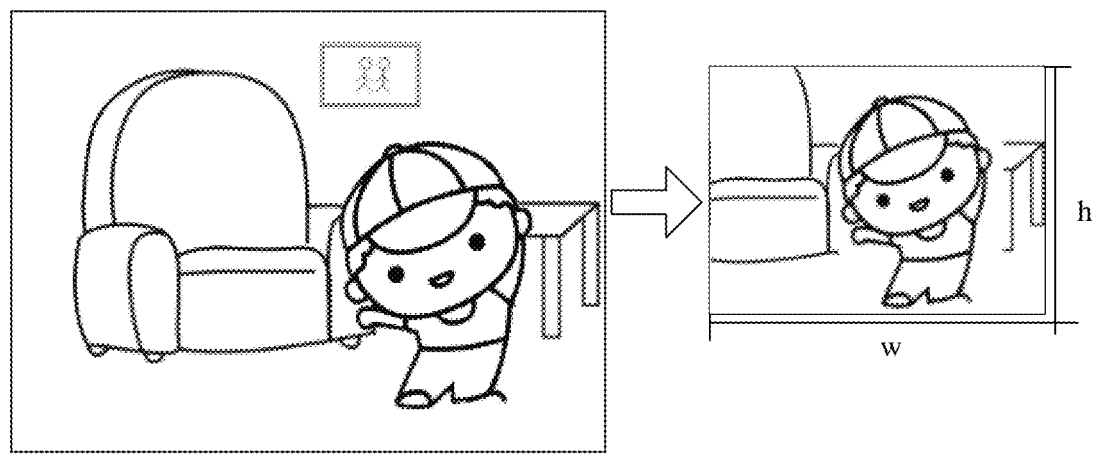
FIG. 19A
FIG. 19B

VIDEO IMAGE PROCESSING METHOD AND APPARATUS

CROSS-REFERENCE TO RELATED APPLICATIONS

This application is a continuation of International Application No. PCT/CN2020/087634, filed on Apr. 28, 2020, which claims priority to Chinese Patent Application No. 201910819774.X, filed on Aug. 31, 2019. The disclosures of the aforementioned applications are hereby incorporated by reference in their entireties.

TECHNICAL FIELD

This application relates to the field of image processing, and in particular, to a video image processing method and apparatus.

BACKGROUND

With the rapid development of image technologies, users have greater requirements for displaying video pictures. For example, the user has a greater requirement for video picture display in a video call process and video picture display in a surveillance scenario. A conventional video collection and display process is as follows: A collection device collects a video image, correspondingly crops and scales the collected video image based on a display specification, then encodes the video image, and sends an encoded image to a display device for display.

Usually, collection and display are implemented based on a fixed hardware platform, and a video image of a fixed field of view is collected by a collection camera. When a location of a subject on a collection side changes, because the collection camera does not perceive the subject, a picture on a display side is always displayed in a fixed field of view. Therefore, an effect of "a picture moves with a subject" cannot be achieved, and user experience is poor.

In view of this, a subject sensing technology is applied to an image collection and display process in the industry. A specific solution is as follows: A camera performs large-resolution collection based on a fixed field of view, performs human body detection and tracking on a collected video image by using the subject sensing technology, and positions a location of a subject in real time, so that when the location of the subject moves, corresponding cropping and scaling can be performed on a large-resolution video image based on a real-time location of the subject (a location of the subject after movement), to obtain a small-resolution image that adapts to a display specification and in which the subject is located in a specific area in the image, thereby implementing real-time adjustment of a displayed picture based on the location of the subject, and achieving the effect of "a picture moves with a subject".

However, when a device environment on the collection side is complex (for example, a background picture is complex or another subject frequently enters or leaves a picture), in the foregoing method, erroneous detection and missing detection may occur and result in inaccurate subject locations positioned in some frames, the cropped and scaled small-resolution image cannot display or cannot completely display the subject, and accordingly pictures of a presented main subject are non-consecutive.

SUMMARY

This application provides a video image processing method and apparatus, to implement a consecutive effect of "a picture moves with a subject" of displayed pictures during a video call.

To achieve the foregoing objective, the following technical solutions are used in this application.

According to a first aspect, a video image processing method is provided. The method may include: obtaining identity information and location information of each subject in an $i^{th}$ video image frame, where i is greater than 1; determining M main subjects from the $i^{th}$ video image frame based on identity information of subjects in N video image frames before the $i^{th}$ video image frame, where M and N are greater than or equal to 1; cropping the $i^{th}$ video image frame based on location information of the main subjects, where a cropped $i^{th}$ video image frame includes the M main subjects; and scaling down or scaling up the cropped video image frame, so that a display displays the cropped $i^{th}$ video image frame based on a preset display specification.

According to the video image processing method provided in this application, a main subject of a video image is determined in combination with identity information of a subject in a current image frame and identity information of subjects in N video image frames before the current frame, so that accuracy of a subject sensing process is greatly improved, and accuracy of a determined location of the main subject is correspondingly improved. In this way, it can be ensured that the main subject can be completely displayed in a small-resolution image obtained after cropping and scaling based on the main subject, to ensure consecutive presented pictures of the main subject, and implement, through software, a consecutive effect of "a picture moves with a subject" of pictures in an image collection and display process.

The identity information of the subject is used to uniquely indicate a same subject in different frames. The identity information may be symbolic information that is of the subject and that is obtained by using a detection and tracking algorithm, that is, each subject has different characteristic information.

The $i^{th}$ video image frame is any video image frame in a video stream, and i is less than or equal to a total frame quantity of the video stream. When the video image processing method provided in this application is performed, the video image processing method provided in this application is performed for each image frame in the video stream, to ensure that the main subject can be completely displayed after each image frame is cropped. Details are not described herein again.

Optionally, the N video image frames before the $i^{th}$ video image frame may be the first N video image frames that are in the video stream and that are consecutive with the $i^{th}$ video image frame, may be the first N video image frames that are in the video stream and that are not consecutive with the $i^{th}$ video image frame, or may be video image frames within a preset time period in the video stream.

The identity information of the subjects in the N video image frames includes identity information of the M main subjects, that is, the M main subjects appear in the first N video image frames. Specifically, whether a subject appears in a video image is identified by using identity information of the subject.

With reference to the first aspect, in a possible implementation, the determining M main subjects from the $i^{th}$ video image frame based on identity information of subjects in N video image frames before the $i^{th}$ video image frame may include: determining the M main subjects from the $i^{th}$ video image frame based on the identity information of each subject in the $i^{th}$ video image frame and the identity information of the subjects in the N video image frames before the $i^{th}$ video image frame.

In a possible implementation, subjects that appear in the first N video image frames, appear in the $i^{th}$ video image frame, and meet a preset condition may be determined as the main subjects. The preset condition may be configured based on an actual case. This is not limited in this application.

With reference to the first aspect and any one of the foregoing possible implementations, in another possible implementation, the determining M main subjects from the $i^{th}$ video image frame based on identity information of subjects in N video image frames before the $i^{th}$ video image frame may be specifically implemented by determining one or more subjects in the $i^{th}$ video image frame as the M main subjects, where among the N video image frames, a quantity of image frames including the subjects is greater than or equal to a first preset threshold. The main subjects are determined by counting the frame quantities, to avoid interference to subject identification when a person who does not participate in a video call enters a picture, thereby improving accuracy of subject identification.

Specifically, a process of determining whether a subject in the $i^{th}$ video image frame is a main subject may include: counting, among the N video image frames, a cumulative quantity of frames including the subject, and if the cumulative quantity of frames including the subject is greater than or equal to the first preset threshold, determining that the subject is a main subject. Whether the subject appears in a video image frame may be specifically implemented by determining whether the video image frame includes a subject that has same identity information as the subject.

A cumulative quantity of frames including a subject is a quantity of consecutive video image frames that are in the N video image frames before the $i^{th}$ video image frame and in which the subject appears; and the consecutive video image frames may include S video image frames in which the subject does not appear, where S is greater than or equal to 0 and less than or equal to a preset frame quantity.

With reference to the first aspect and any one of the foregoing possible implementations, in another possible implementation, the video image processing method provided in this application may further include: dividing the $i^{th}$ video image frame into Y areas; and configuring a preset threshold corresponding to each area, where a preset threshold corresponding to a $k^{th}$ area is a $k^{th}$ preset threshold, the $k^{th}$ area is any area in the Y areas, Y is greater than or equal to 2, and k is greater than or equal to 1 and less than or equal to Y. Preset thresholds corresponding to different areas may be different. Correspondingly, the determining M main subjects from the $i^{th}$ video image frame based on identity information of subjects in N video image frames before the $i^{th}$ video image frame is specifically implemented by determining one or more subjects in the $i^{th}$ video image frame as the M main subjects, where among the N video image frames, a quantity of video image frames including the subjects is greater than or equal to preset thresholds corresponding to areas in which the subjects are located. Different preset thresholds are configured for different areas, to improve accuracy of main subject determining, thereby improving accuracy of subject identification.

With reference to the first aspect, in a possible implementation, the method further includes: obtaining subject information of each subject in the $i^{th}$ video image frame, where the subject information may include one or more of the following information: information about whether a subject speaks and priority information. Correspondingly, the determining M main subjects from the $i^{th}$ video image frame based on identity information of subjects in N video image frames before the $i^{th}$ video image frame may be specifically implemented by determining one or more subjects in the $i^{th}$ video image frame as the M main subjects, where among the N video image frames, a quantity of video image frames including the subjects that speak is greater than or equal to a second preset threshold; determining one or more subjects in the $i^{th}$ video image frame as the M main subjects, where among the N video image frames, priority information of the subjects is greater than a third preset threshold; or selecting, based on the priority information, the most important M subjects from one or more subjects in the $i^{th}$ video image frame as the M main subjects, where among the N video image frames, a quantity of video image frames including the subjects that speak is greater than or equal to a second preset threshold.

The information about whether a subject speaks is used to indicate that a subject in a video image is talking or is not talking. The information about whether a subject speaks may be obtained by combining an audio processing technology with a mouth shape of a subject in a video image, or the information about whether a subject speaks may be obtained by directly using a mouth shape of a subject in a video image.

The priority information is used to indicate importance of a subject in a video image, and priority information of different subjects that use a device may be preconfigured to correspond to identity information of the subjects. Then, when each video image frame is processed, the preconfigured priority information is searched for when the identity information of the subject is obtained, to obtain the priority information of the subject. Alternatively, priority information entered by a user for different subjects in a video image may be received.

With reference to the first aspect and any one of the foregoing possible implementations, in another possible implementation, the video image processing method provided in this application may further include: receiving priority information entered by a user. In this way, the user configures a subject priority level in real time, thereby improving accuracy of subject identification.

With reference to the first aspect and any one of the foregoing possible implementations, in another possible implementation, the cropping the $i^{th}$ video image frame based on location information of the main subjects may be specifically implemented by: determining a cropping box, where the cropping box includes a minimum external rectangular frame of the M main subjects; and cropping the $i^{th}$ video image frame by using the determined cropping box.

The cropping box may be the minimum external rectangular frame of the M main subjects plus a cropping margin, and the cropping margin may be greater than or equal to 0.

It should be noted that the cropping box includes a minimum external rectangular frame of the M main subjects may be understood as that the determined cropping box includes the minimum external rectangular frame of the M main subjects as complete as possible.

With reference to the first aspect and any one of the foregoing possible implementations, in another possible implementation, the determining a cropping box may be specifically implemented by: obtaining a distance between a center point of a to-be-selected cropping box and a center point of a cropping box of a previous video image frame, where the to-be-selected cropping box includes the minimum external rectangular frame of the M main subjects; and if the distance is greater than or equal to a distance threshold, enlarging the to-be-selected cropping box, until the distance between the center point of the to-be-selected cropping box and the center point of the cropping box of the previous video image frame is less than the distance threshold, and using an enlarged to-be-selected cropping box as the determined cropping box.

The to-be-selected cropping box may be the minimum external rectangular frame of the M main subjects plus a cropping margin, and the cropping margin may be greater than or equal to 0.

With reference to the first aspect and any one of the foregoing possible implementations, in another possible implementation, the determining a cropping box may be specifically implemented by: obtaining a distance between a center point of a first to-be-selected cropping box and a center point of a cropping box of a previous video image frame, where the first to-be-selected cropping box includes the minimum external rectangular frame of the M main subjects; if the distance is greater than or equal to a distance threshold, determining a second cropping box, where a center point of the second cropping box is the center point of the cropping box of the previous video image frame plus an offset, and a size of the second cropping box is the same as a size of the cropping box of the previous video image frame; and if the second cropping box includes the minimum external rectangular frame of the M main subjects, using a third cropping box as the cropping box, where the third cropping box is the second cropping box, or the third cropping box is a cropping box obtained by narrowing the second cropping box to include the minimum external rectangular frame; or if the second cropping box does not completely include the minimum external rectangular frame, enlarging the second cropping box to include the minimum external rectangular frame, and using an enlarged second cropping box as the cropping box.

The offset may be a preset value, may be the distance between the center point of the first to-be-selected cropping box and the center point of the cropping box of the previous video image frame multiplied by a weighted value, or the like.

With reference to the first aspect and any one of the foregoing possible implementations, in another possible implementation, when the subject information includes the priority information, the to-be-selected cropping box or the first to-be-selected cropping box may be an external rectangular frame plus a cropping margin, where the external rectangular frame is centered on a subject with a highest priority in the M main subjects and includes the M main subjects.

With reference to the first aspect and any one of the foregoing possible implementations, in another possible implementation, when the subject information includes the information about whether a subject speaks, the to-be-selected cropping box or the first to-be-selected cropping box may be an external rectangular frame plus a cropping margin, where the external rectangular frame is centered on a speaking subject in the M main subjects and includes the M main subjects.

With reference to the first aspect and any one of the foregoing possible implementations, in another possible implementation, the video image processing method provided in this application may further include: displaying the cropped $i^{th}$ video image frame based on the preset display specification. The preset display specification may be a specification that adapts to the display, or may be a screen-to-body ratio.

With reference to the first aspect and any one of the foregoing possible implementations, in another possible implementation, the video image processing method provided in this application may further include: saving at least one of the following information of each subject in the $i^{th}$ video image frame: identity information, location information, and subject information.

With reference to the first aspect and any one of the foregoing possible implementations, in another possible implementation, the video image processing method provided in this application may further include: obtaining a $j^{th}$ video image frame, where j is less than or equal to X, and X is greater than 1; obtaining and saving identity information and location information of each subject in the $j^{th}$ video image frame; and directly scaling down the $i^{th}$ video image frame into an image of the preset display specification.

With reference to the first aspect or any one of the foregoing possible implementations, in another possible implementation, the video image processing method provided in this application is applied to a transmitter device in a video call, and the video image processing method provided in this application may further include: sending an $i^{th}$ video image frame obtained after scaling down or scaling up to a receiver device.

According to a second embodiment, a video image processing apparatus is provided in this application. The apparatus may be an electronic device, may be an apparatus or a chip system in an electronic device, or may be an apparatus that can match with an electronic device for use. The video image processing apparatus may implement functions performed in the foregoing aspect or the possible designs. The functions may be implemented by hardware, or may be implemented by hardware by executing corresponding software. The hardware or the software includes one or more modules corresponding to the foregoing functions. For example, the video image processing apparatus may include: an obtaining unit, a determining unit, a cropping unit, and a scaling unit.

The obtaining unit is configured to obtain identity information and location information of each subject in an $i^{th}$ video image frame, where i is greater than 1. The determining unit is configured to determine M main subjects from the $i^{th}$ video image frame based on identity information of subjects in N video image frames before the $i^{th}$ video image frame, where M and N are greater than or equal to 1, and the identity information of the subjects in the N video image frames includes identity information of the M main subjects. The cropping unit crops the $i^{th}$ video image frame based on location information of the main subjects, where a cropped $i^{th}$ video image frame includes the M main subjects. The scaling unit scales down or scales up the cropped $i^{th}$ video image frame, so that a display displays the cropped $i^{th}$ video image frame based on a preset display specification.

It should be noted that the video image processing apparatus provided in the second aspect is configured to perform the video image processing method provided in the first aspect. For specific implementation, refer to specific implementation of the first aspect.

According to a third aspect, an embodiment of this application provides an electronic device. The electronic device may include a processor and a memory, where the processor is coupled to the memory, and the memory may be configured to store computer program code. The computer program code includes computer instructions. When the computer instructions are executed by the electronic device, the electronic device is enabled to perform the video image processing method described in the first aspect or any one of the possible implementations of the first aspect.

According to a fourth aspect, an embodiment of this application provides a computer-readable storage medium. The computer-readable storage medium may include computer software instructions. When the computer software instructions are run in an electronic device, the electronic device is enabled to perform the video image processing method described in the first aspect or any one of the possible implementations of the first aspect.

According to a fifth aspect, an embodiment of this application provides a computer program product. When the computer program product runs on a computer, the computer is enabled to perform the video image processing method described in the first aspect or any one of the possible implementations of the first aspect.

According to a sixth aspect, an embodiment of this application provides a chip system. The chip system is applied to an electronic device. The chip system includes an interface circuit and a processor. The interface circuit is interconnected with the processor by using a line. The interface circuit is configured to receive a signal from a memory of the electronic device, and send the signal to the processor, where the signal includes computer instructions stored in the memory. When the processor executes the computer instructions, the chip system performs the video image processing method described in the first aspect or any one of the possible implementations of the first aspect.

According to a seventh aspect, an embodiment of this application provides a graphical user interface (GUI). The graphical user interface is stored in an electronic device. The electronic device includes a display, a memory, and one or more processors. The one or more processors are configured to execute one or more computer programs stored in the memory. The graphical user interface includes a GUI displayed on the display. The GUI includes a video picture. The video picture includes an $i^{th}$ video image frame processed according to the first aspect or any possible implementation. The video picture is transmitted by another electronic device (for example, a second electronic device) to the electronic device, and the second electronic device includes a display and a camera.

It should be understood that descriptions of technical features, technical solutions, beneficial effects, or similar terms in this application do not imply that all features and advantages can be implemented in any individual embodiment. On the contrary, it may be understood that descriptions of the features or the beneficial effects mean that at least one embodiment includes a specific technical feature, technical solution, or beneficial effect. Therefore, the descriptions of the technical features, the technical solutions, or the beneficial effects in this specification may not necessarily belong to a same embodiment. Further, the technical features, the technical solutions, and the beneficial effects described in the embodiments may be combined in any proper manner. A person skilled in the art understands that an embodiment may be implemented without one or more specific technical features, technical solutions, or beneficial effects in a specific embodiment. In other embodiments, additional technical features and beneficial effects may be further identified in a specific embodiment that does not reflect all the embodiments.

BRIEF DESCRIPTION OF DRAWINGS

FIG. 18C is a schematic diagram of still another video call interface according to an embodiment of this application;

FIG. 19A and FIG. 19B are schematic diagrams of still another video image processing according to an embodiment of this application;

FIG. 19A(a) and FIG. 19A(b) are schematic diagrams of still another video image processing according to an embodiment of this application;

FIG. 21A(a) and FIG. 21A(b) are schematic diagrams of still another video image processing according to an embodiment of this application;

DESCRIPTION OF EMBODIMENTS

Figure 1:
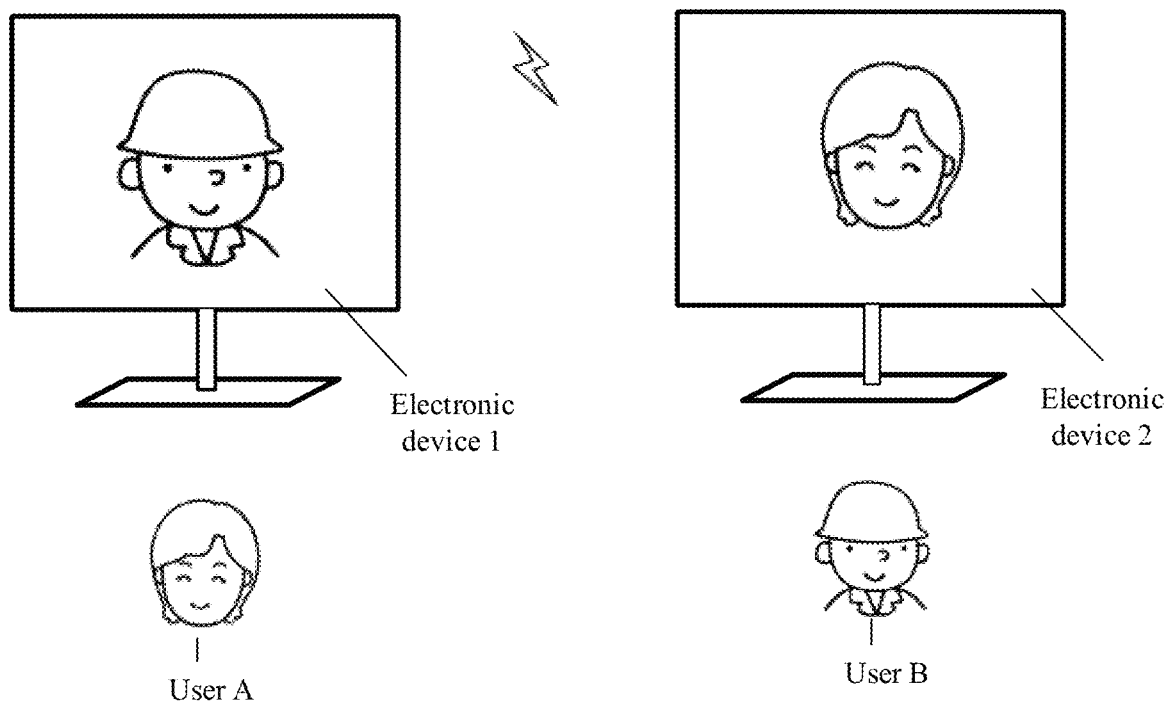
FIG. 1 is a schematic diagram of a video scenario according to an embodiment of this application.

In the specification, claims, and accompanying drawings of this application, the terms "first", "second", "third" and the like are intended to distinguish between different objects but do not limit a particular order.

In addition, in the embodiments of this application, the word "example" or "for example" is used to represent giving an example, an illustration, or a description. Any embodiment or design solution described as the word "example" or "for example" in the embodiments of this application should not be explained as being more preferred or having more advantages than another embodiment or design solution. Exactly, use of the word the word "example" or "for example" or the like is intended to present a relative concept in a specific manner.

For ease of understanding, terms involved in this application are first explained.

A video stream may be data transmitted in a video service, that is, a dynamic consecutive image sequence in a video call, a video conference, or a surveillance scenario.

A video image may be a static picture, and each image frame in a video stream is referred to as a video image.

A subject may be a moving subject or a static subject in a video image. Certainly, in application scenarios of this application, the subject may be applicable to a moving subject or a static subject in a video image, and may be applicable to another main object in the video image, for example, a moving animal, a static animal, or another object. The following uses a subject in a video image as an example for description. This should not be construed as a limitation on the application scenarios.

Identity information may be a characteristic identifier of each subject identified in a video image by using a human body detection and tracking algorithm, and is used to uniquely identify a same subject in different frames, to distinguish between different subject individuals. The identity information may include but is not limited to appearance information, labeling information, or other identified characteristic information. An expression form of the identity information may include a text, a serial number, a subject number, or other information related to an individual characteristic.

Location information may be used to indicate, in a video image, a relative location or an area of a subject in the video image. A form of the location information may be a pixel location of one or more points of the subject in the video image, a pixel location of an outline of the subject, a pixel location of the area in which the subject is located, or the like. The pixel location may be indicated by a pixel coordinate or the like. The location information is used to indicate the relative location of the subject in the video image, and is not limited to a specific location.

Subject information may be additional information that is of each subject in a video image and that is obtained by using an identification algorithm or a labeling algorithm, so that subject identification and main subject determining are better performed. The subject information may include but is not limited to one or more of the following information: information about whether a subject speaks, subject priority information, and the like.

Currently, in a video collection and display process, to implement an effect of "a picture moves with a subject", there are two solutions in the industry.

One solution is a hardware implementation solution. A camera with a pan-tilt-zoom is used to position a subject location with the help of an additional subject positioning device (for example, a location of a speaker is positioned by using a voice), and the pan-tilt-zoom is controlled, so that the camera points to a direction of the speaker for collection. In the hardware solution in which the pan-tilt-zoom camera is used, a volume of the pan-tilt-zoom camera is large, costs are high, and it is not conducive to large-scale popularization.

Another solution is a software algorithm implementation solution. A camera performs large-resolution collection based on a fixed field of view, a subject location is positioned in real time by using a subject detection and tracking algorithm, and corresponding cropping and scaling down or scaling up (scaling) is performed on a large-resolution image based on the positioned subject location, to obtain a small-resolution image of a fixed specification. However, the software solution may have defects such as erroneous detection and missing detection. If cropping is performed directly after positioning, accuracy of subject sensing is not high, and it is difficult to ensure consecutiveness of a finally displayed picture.

In view of this, an embodiment of this application provides a video image processing method, to implement, through software, a consecutive effect of "a picture moves with a subject" of presented pictures of a main subject. The method may be applied to an electronic device. In the method provided in this embodiment, a video image is processed to position a subject, a main subject is determined by using subject identity information of a current frame and subject identity information of a historical frame, and a collected current video image frame is cropped and scaled based on the main subject. Therefore, accuracy of a subject sensing process is greatly improved, and accuracy of a determined location of the main subject is correspondingly improved. In this way, it can be ensured that the main subject can be completely displayed in a small-resolution image obtained after cropping and scaling based on the main subject, to ensure consecutive presented pictures of the main subject, and implement, through software, a consecutive effect of "a picture moves with a subject" of pictures in an image collection and display process.

The following describes implementations of the embodiments of this application in detail with reference to the accompanying drawings.

The video image processing method provided in this embodiment of this application may be applied to a video image collection and display process of the electronic device. The image collection and display process may be a video call (video conference) scenario, a video surveillance scenario, or the like. For example, when the video image collection and display process is a video call scenario, as shown in FIG. 1, a user A uses an electronic device 1, a user B uses an electronic device 2, and the user A performs a video call with the user B.

Figure 2:
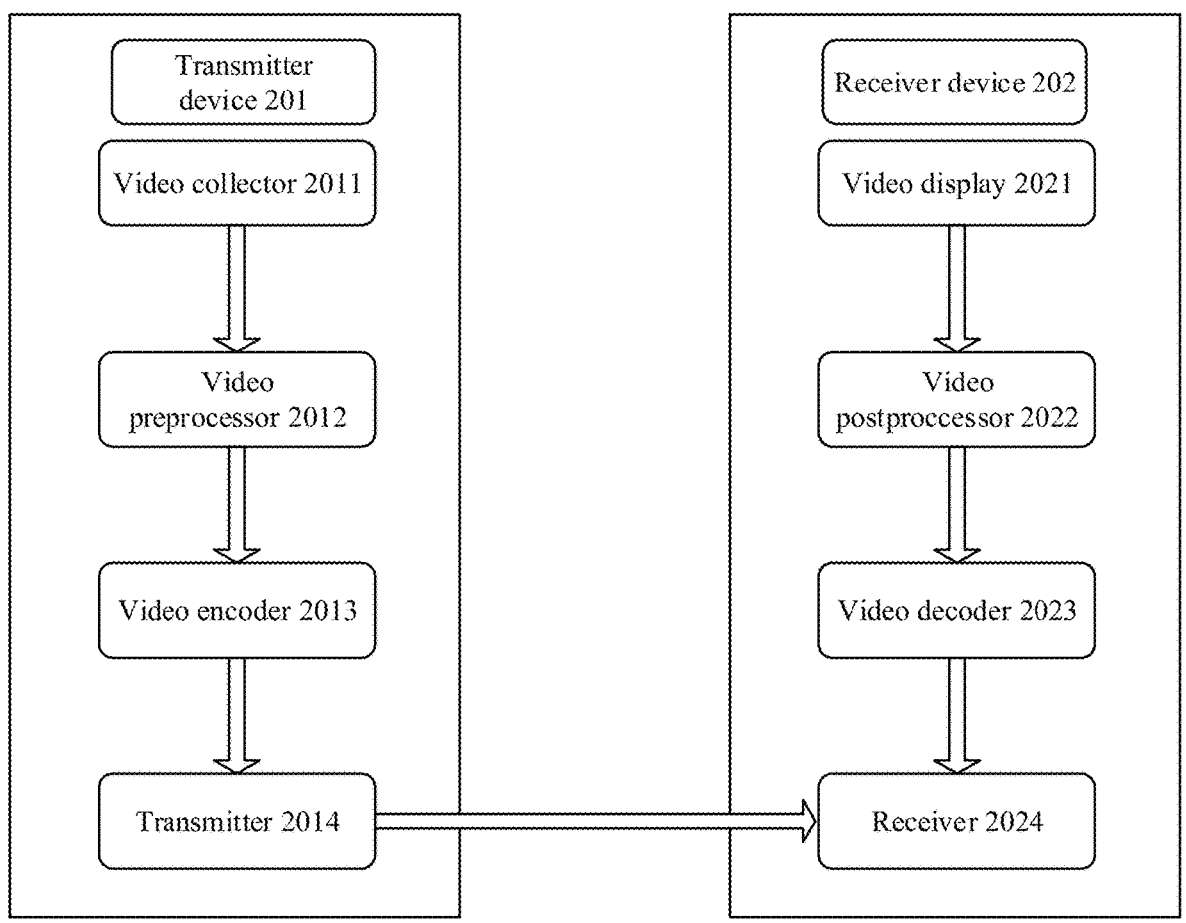
FIG. 2 is a schematic diagram of a system architecture of a video call scenario according to an embodiment of this application.

FIG. 2 is a schematic diagram of a system architecture in which the foregoing video image processing method is applied to a video call scenario according to an embodiment of this application. As shown in FIG. 2, the system architecture may include a transmitter device 201 and a receiver device 202.

Specifically, the transmitter device 201 may be used as one end of a video call to communicate with the receiver device 202. For example, one or more users 1 may communicate with one or more users 2 of the receiver device 202 by using the transmitter device 201.

The call in this embodiment may be a video call or video conference. Therefore, the transmitter device 201 includes at least a camera and a display, and the receiver device 202 also includes at least a camera and a display. In addition, the transmitter device 201 and the receiver device 202 each may further include a receiver (or a loudspeaker), a microphone, and the like. The camera may be configured to collect a video image during a call. The display may be configured to display an image during a call. The receiver (or the loudspeaker) is configured to play a voice during a call. The microphone is configured to collect a voice during a call.

Specifically, as shown in FIG. 2, the transmitter device 201 includes a video collector 2011, a video preprocessor 2012, a video encoder 2013, and a transmitter 2014. The receiver device 202 includes a video display 2021, a video postprocessor 2022, a video decoder 2023, and a receiver 2024.

An operating procedure of the system architecture shown in FIG. 2 is as follows: The video collector 2011 of the transmitter device 201 collects video images in a video call by frame, and transmits the collected video images to the video preprocessor 2012 to perform corresponding preprocessing (including but not limited to: subject identification, cropping, and scaling); then, the video encoder 2013 encodes the video images, and transmits encoded video images to the transmitter 2014; the transmitter 2014 sends the encoded video images to the receiver 2024 of the receiver device 202 by using a wired or wireless medium; and the receiver 2024 transmits the received video images to the video decoder 2023 for decoding, and decoded video images are processed by the video postprocessor 2022 and then transmitted to the video display 2021 for display.

For example, the electronic device described in this embodiment of this application may be a television, a mobile phone, a tablet computer, a desktop computer, a laptop computer, a hand-held computer, a notebook computer (for example, a Huawei notebook computer), an ultra-mobile personal computer (UMPC), a netbook, or a device that includes or is connected to a display and a camera, for example, a cellular phone, a personal digital assistant (PDA), or an augmented reality (AR) device/a virtual reality (VR) device. A specific form of the device is not particularly limited in this embodiment of this application.

In addition, in some embodiments, the transmitter device 201 and the receiver device 202 may be electronic devices of a same type, for example, both the transmitter device 201 and the receiver device 202 are televisions. In some other embodiments, the transmitter device 201 and the receiver device 202 may be electronic devices of different types, for example, the transmitter device 201 is a television, and the receiver device 202 is a notebook computer. With reference to a specific example, a video image transmission process in a video call or video conference is described herein.

Figure 3:
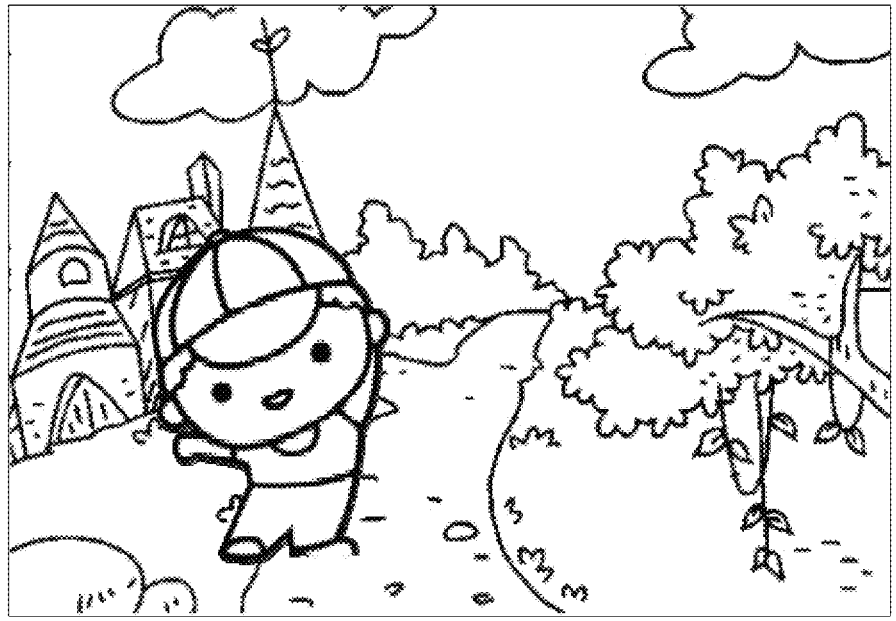
FIG. 3 is a schematic diagram of a video image according to an embodiment of this application.
Figure 4:
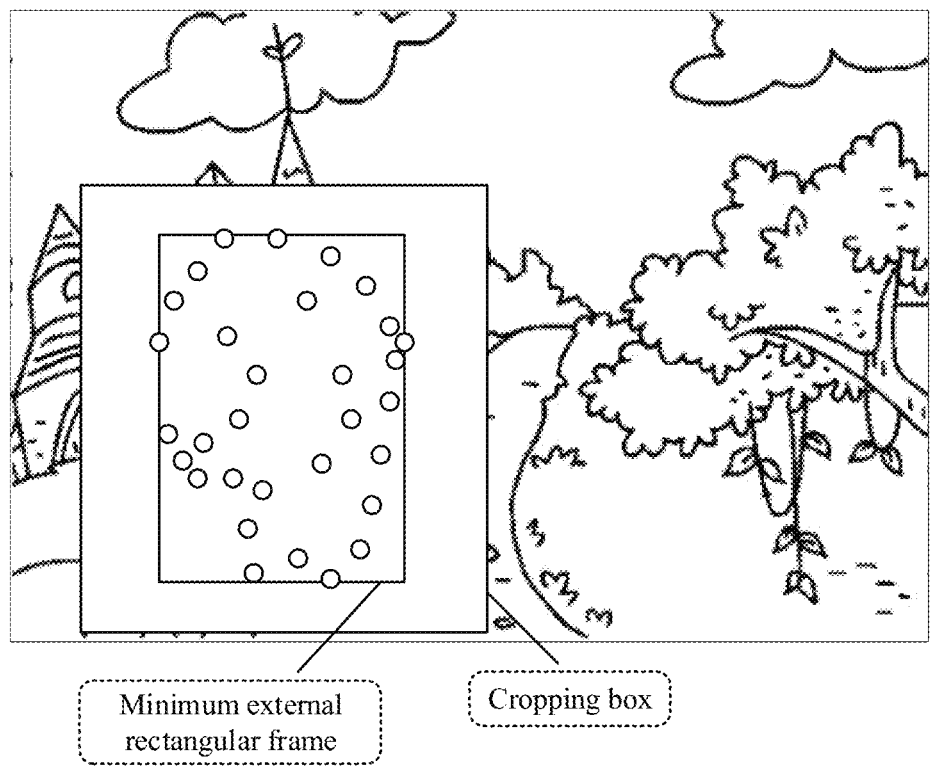
FIG. 4 is a schematic diagram of video image processing according to an embodiment of this application.

For example, in the scenario shown in FIG. 1, it is assumed that the electronic device 1 is a transmitter device and the electronic device 2 is a receiver device. A video image of a fixed field of view collected by the camera of the electronic device 1 at a specific moment may be shown in FIG. 3. The electronic device 1 identifies identity information and location information of a subject in the video image shown in FIG. 3 by using a subject detection and tracking algorithm. For example, the location information may be a coordinate shown in FIG. 4. The coordinate herein is, for example, a specific coordinate of each key point of the subject. The key point may include but is not limited to: a head, a shoulder, an arm, a hand, a leg, a foot, an eye, a nose, a mouth, or a piece of clothing. In FIG. 4, the coordinate is shown as different points, and each coordinate point has a determined coordinate value in the video image. The electronic device 1 determines a minimum external rectangular frame of the identified subject, as shown in FIG. 4. It is assumed that a display specification of the electronic device 2 is a resolution image with a width w and a height h, the electronic device 1 uses the minimum external rectangular frame as a center, and crops the video image shown in FIG. 3 based on an aspect ratio of the display specification of the electronic device 2, to obtain a cropping result shown in FIG. 5. The electronic device 1 scales the cropping result shown in FIG. 5 into a resolution image with a width w and a height h, as shown in FIG. 6. A specific scaling process is as follows: If resolution of the cropping result is less than the width w and the height h, scaling up is performed; or if resolution of the cropping result is greater than the width w and the height h, scaling down is performed.

Figure 7:
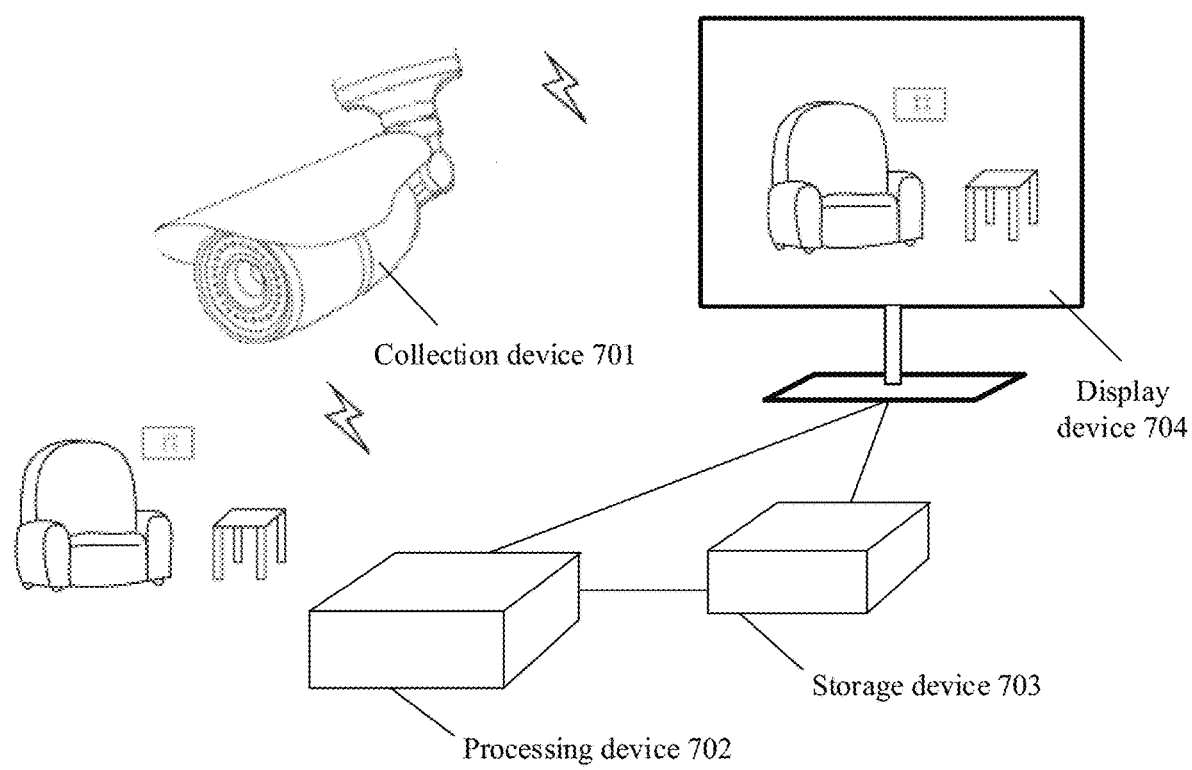
FIG. 7 is a schematic diagram of a system architecture of a video surveillance scenario according to an embodiment of this application.

FIG. 7 is a schematic diagram of a system architecture in which the foregoing video image processing method is applied to a video surveillance scenario according to an embodiment of this application. As shown in FIG. 7, the system architecture may include a collection device 701, a processing device 702, a storage device 703, and a display device 704.

It should be noted that the devices included in the system architecture shown in FIG. 7 may be deployed in a centralized manner, or may be deployed in a distributed manner. The devices included in the system architecture shown in FIG. 7 may be deployed in at least one electronic device.

An operating procedure of the system architecture shown in FIG. 7 is as follows: The collection device 701 collects video images by frame, and transmits the collected video images to the processing device 702 for corresponding preprocessing (including but not limited to: subject identification, cropping, and scaling), and then, processed video images are stored in the storage device 703. The display device 704 obtains the video images from the storage device 703 and displays the video images.

Figure 8:
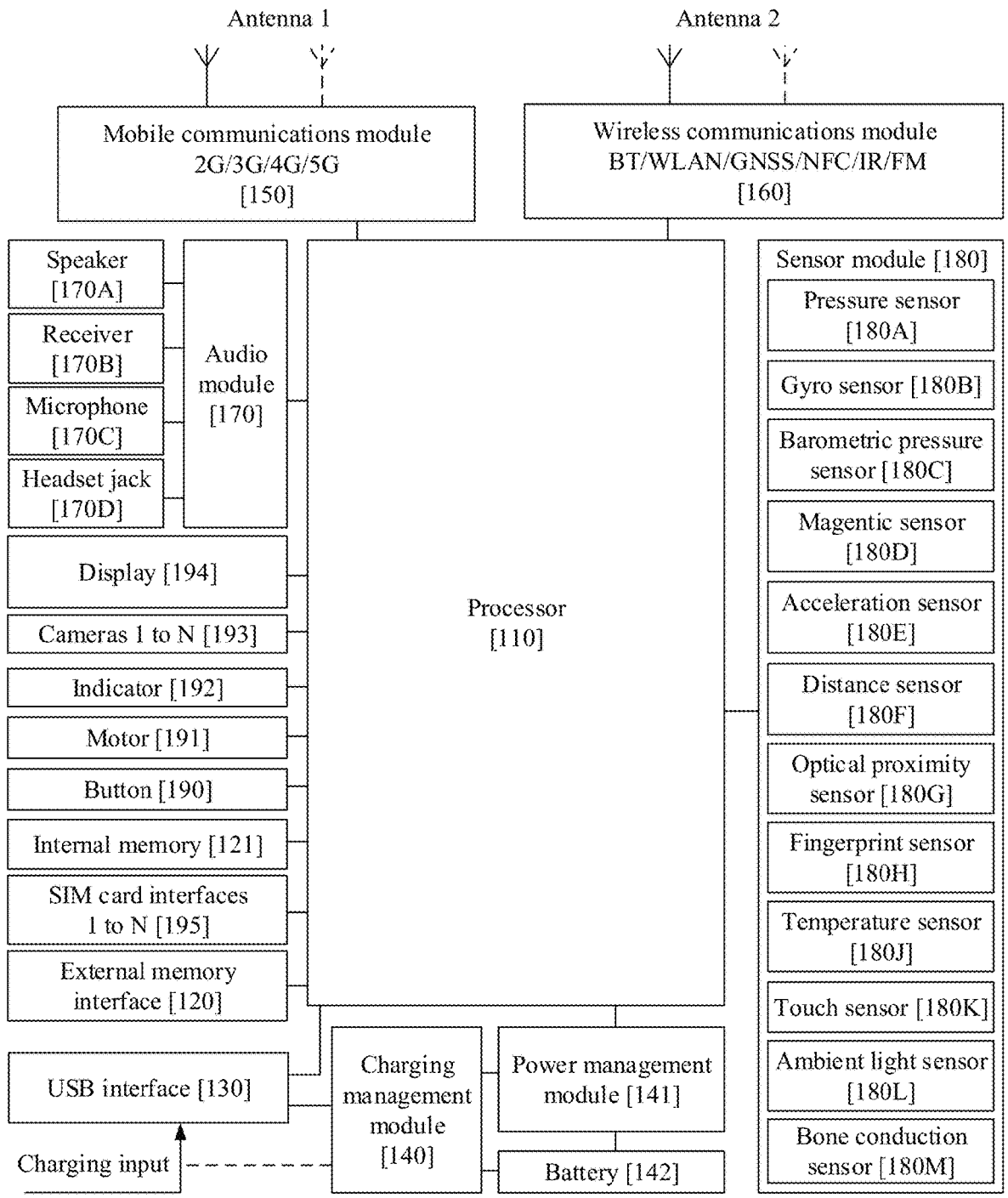
FIG. 8 is a schematic diagram of a structure of an electronic device according to an embodiment of this application.

FIG. 8 is a schematic diagram of a structure of an electronic device according to an embodiment of this application. A structure of an electronic device in which the transmitter device 201, the receiver device 202, and the devices included in the system architecture shown in FIG. 7 are located may be shown in FIG. 8.

As shown in FIG. 8, the electronic device may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not constitute a specific limitation on the electronic device. In some other embodiments, the electronic device may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data that have or has been used are or is cyclically used by the processor 110. If the processor 110 needs to use the instructions or the data again, the processor may directly invoke the instructions or the data from the memory. This avoids repeated access and reduces a waiting time of the processor 110, thereby improving efficiency of the system.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, an SIM interface, a USB port, and/or the like.

The charging management module 140 is configured to receive a charging input from the charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input through a wireless charging coil of the electronic device. The charging management module 140 may further supply power to the electronic device by using the power management module 141 while charging the battery 142.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera module 193, the wireless communications module 160, and the like. The power management module 141 may be further configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna of the electronic device may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a solution that is applied to the electronic device and that includes wireless communication such as the 2nd generation mobile communication technology (2G)/the 3rd generation mobile communication technology (3G)/the 4th generation mobile communication technology (4G)/the 5th generation mobile communication technology (5G). The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave by using the antenna 1 for radiation. In some embodiments, at least some functional modules of the mobile communications module 150 may be disposed in the processor 110. In some embodiments, at least some functional modules of the mobile communications module 150 and at least some modules of the processor 110 may be disposed in a same device.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transfers the low-frequency baseband signal obtained through demodulation to the baseband processor for processing. After being processed by the baseband processor, the low frequency baseband signal is transmitted to the application processor. The application processor outputs a sound signal over an audio device (which is not limited to the speaker 170A, the telephone receiver 170B, and the like), or displays an image or a video over the display 194. In some embodiments, the modem processor may be an independent device. In some other embodiments, the modem processor may be independent of the processor 110, and is disposed in a same device with the mobile communication module 150 or another functional module.

The wireless communications module 160 may provide wireless communication solutions, applied to the electronic device, for example, a wireless local area network (WLAN) (such as a wireless fidelity (Wi-Fi) network), Bluetooth (BT), a global navigation satellite system (GNSS), frequency modulation (FM), near field communication (NFC), and infrared (IR) technologies. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, the antenna 1 of the electronic device is coupled to the mobile communications module 150, and the antenna 2 is coupled to the wireless communications module 160, so that the electronic device may communicate with a network and another device by using a wireless communications technology. For example, the electronic device may perform a video call or video conference with another electronic device by using the antenna 1 and the mobile communications module 150. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device implements a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs, which execute a program instruction to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device may include one or N displays 194, where N is a positive integer greater than 1. For example, in this embodiment of this application, when a user uses the electronic device to perform a video call or video conference with a user of another electronic device, the display 194 may display a video answering interface, a video reminding interface, a video call interface, or a video surveillance interface (for example, including a video image sent by a peer device and a video image collected by this device).

The electronic device may implement a photography function through the ISP, the camera 193, the video codec, the GPU, the display 194, the application processor, and the like.

The ISP is configured to process data fed back by the camera 193. For example, during shooting, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photography scenario. In some embodiments, the ISP may be disposed in the camera 193.

The camera 193 is configured to capture a static image or a video. For example, in this embodiment of this application, the camera 193 may be configured to collect a video image during a video call or video conference. An optical image of an object is generated by using the lens, and is projected onto the photosensitive element. The light-sensitive element may be a charge coupled device (CCD) or a complementary metal-oxide-semiconductor (CMOS) phototransistor. The photosensitive element converts the optical signal into an electrical signal, and then transfers the electrical signal to the ISP for conversion into a digital image signal. The ISP outputs the digital image signal to the DSP for processing. The DSP converts the digital image signal into an image signal in a standard format such as RGB or YUV. In some embodiments, the electronic device may include one or N cameras 193, where N is a positive integer greater than 1. In this embodiment, the camera 193 may be disposed in the electronic device in a hidden manner, or may not be disposed in a hidden manner. This is not specifically limited in this embodiment.

The digital signal processor is configured to process a digital signal. For example, for a digital video image, a human body detection and tracking algorithm is used to determine a main subject in the video image, and then corresponding cropping and scaling are performed on the video image, to obtain an image adapted to a display specification of a receiver device.

The video codec is configured to compress or decompress a digital video. The electronic device may support one or more video codecs. In this way, the electronic device may play or record videos in a plurality of coding formats, for example, moving picture experts group (MPEG)-1, MPEG-2, MPEG-3, and MPEG-4.

The NPU is a neural-network (neural-network, NN) computing processor. The NPU quickly processes input information based on a structure of a biological neural network, for example, a transfer mode between human brain neurons, and may further continuously perform self-learning. An application such as intelligent cognition, for example, image recognition, facial recognition, speech recognition, or text understanding of the electronic device may be implemented by using the NPU.

The external memory interface 120 may be configured to connect to an external memory card, for example, a micro SD card, to extend a storage capability of the electronic device. The external storage card communicates with the processor 110 by using the external memory interface 120, to implement a data storage function. For example, files such as music and a video are stored in the external memory card.

The internal memory 121 may be configured to store computer-executable program code, and the executable program code includes instructions. The processor 110 runs the instructions stored in the internal memory 121, to perform various function applications and data processing of the electronic device. For example, in this embodiment of this application, the processor 110 may process a video image by executing the instructions stored in the internal memory 121 to position subjects, determine a main subject based on subject information of a current frame and subject information of a historical frame, and crop and scale a collected current video image frame based on the main subject, to ensure that displayed pictures of the receiver device are consecutive, and implement a consecutive effect of "a picture moves with a subject" of displayed pictures during a video call. The internal memory 121 may include a program storage area and a data storage area. The program storage area may store an operating system, an application required by at least one function (for example, a sound playing function or an image playing function), and the like. The data storage area may store data (such as audio data and a phone book) created when the electronic device is used, and the like. In addition, the internal memory 121 may include a high-speed random access memory, and may further include a non-volatile memory, for example, at least one magnetic disk storage device, a flash memory, or a universal flash storage (UFS). In this embodiment, the internal memory 121 may be further configured to store an original large-resolution video image collected by the camera 193, a small-resolution video image obtained after subject identification, subject selecting, and cropping and scaling performed by the processor 110, subject information of each video image frame, and the like.

The electronic device may implement audio functions by using the audio module 170, the speaker 170A, the receiver 170B, the microphone 170C, the headset jack 170D, the application processor, for example, implement a call, music playing, recording, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device may listen to music or answer a hands-free call through the speaker 170A.

The receiver 170B, also referred to as an "earpiece", is configured to convert an audio electrical signal into a sound signal. When a call is answered or voice information is received by using the electronic device, the receiver 170B may be put close to a human ear to receive a voice.

The microphone 170C, also referred to as a "mike" or a "mic", is configured to convert a sound signal into an electrical signal. When making a call or sending voice information, or when the electronic device needs to be triggered by using a voice assistant to perform some functions, a user may make a sound by approaching the microphone 170C with a mouth, and input a sound signal to the microphone 170C. At least one microphone 170C may be disposed in the electronic device. In some other embodiments, two microphones 170C may be disposed in the electronic device, to implement a noise reduction function, in addition to collecting a sound signal. In some other embodiments, three, four, or more microphones 170C may alternatively be disposed in the electronic device, to collect a sound signal and reduce noise. The microphones may further identify a sound source, to implement a directional recording function, and the like.

The headset jack 170D is configured to connect to a wired headset. The headset jack 170D may be the USB port 130, or may be a 3.5 mm open mobile terminal platform (OMTP) standard interface, or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device determines strength of pressure based on a change of the capacitance. When a touch operation is performed on the display 194, the electronic device detects strength of the touch operation by using the pressure sensor 180A. The electronic device may further calculate a touch position based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an application icon "Messages", an instruction for viewing an SMS message is executed. When a touch operation whose touch operation intensity is greater than or equal to the first pressure threshold is performed on an application icon "Messages", an instruction for creating an SMS message is executed.

The gyro sensor 180B may be configured to determine a motion posture of the electronic device. In some embodiments, angular velocities of the electronic device around three axes (namely, axes x, y, and z) may be determined by using the gyro sensor 180B. The gyroscope sensor 180B may be configured to implement image stabilization during photography. For example, when the shutter is pressed, the gyro sensor 180B detects an angle at which the electronic device shakes, and calculates, based on the angle, a distance for which a lens module needs to compensate, so that the lens cancels the shake of the electronic device through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device calculates an altitude based on a barometric pressure value measured by the barometric pressure sensor 180C, to assist in positioning and navigation.

The magnetic sensor 180D includes a Hall effect sensor. The electronic device may detect opening and closing of a flip cover by using the magnetic sensor 180D. In some embodiments, when the electronic device is a clamshell phone, the electronic device may detect opening and closing of a flip cover by using the magnetic sensor 180D. Further, a feature such as automatic unlocking upon opening of the flip cover is set based on a detected opening or closing state of the flip cover.

The acceleration sensor 180E may detect magnitude of accelerations in various directions (usually on three axes) of the electronic device. When the electronic device is still, a value and a direction of gravity may be detected. The acceleration sensor may be further configured to recognize a posture of the electronic device, and is used in screen switching between a landscape mode and a portrait mode, a pedometer, or another application.

The distance sensor 180F is configured to measure a distance. The electronic device may measure the distance in an infrared or a laser manner. In some embodiments, in a photography scenario, the electronic device may measure a distance by using the distance sensor 180F, to implement quick focusing.

The optical proximity sensor 180G may include a light-emitting diode (LED) and an optical detector, for example, a photodiode. The light-emitting diode may be an infrared light-emitting diode. The electronic device emits infrared light through the light-emitting diode. The electronic device detects infrared reflected light from a nearby object by using the photodiode. When sufficient reflected light is detected, it may be determined that there is an object near the electronic device. When insufficient reflected light is detected, the electronic device may determine that there is no object near the electronic device. The electronic device may detect, by using the optical proximity sensor 180G, that the user holds the electronic device close to an ear for a call, to automatically turn off a screen for power saving. The optical proximity sensor 180G may also be used in a flip cover mode or a pocket mode to automatically unlock or lock the screen.

The ambient light sensor 180L is configured to sense ambient light brightness. The electronic device may adaptively adjust brightness of the display 194 based on the sensed ambient light brightness. The ambient light sensor 180L may also be configured to automatically adjust a white balance during photography. The ambient light sensor 180L may also cooperate with the optical proximity sensor 180G to detect whether the electronic device is in a pocket, to avoid an accidental touch.

The fingerprint sensor 180H is configured to collect a fingerprint. The electronic device may implement, by using a characteristic of a collected fingerprint, fingerprint unlocking, accessing an application lock, fingerprint photography, answering an incoming call by using a fingerprint, and the like.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device degrades performance of a processor near the temperature sensor 180J, to reduce power consumption and implement thermal protection. In some other embodiments, when the temperature is lower than another threshold, the electronic device heats up the battery 142, to avoid abnormal shutdown of the electronic device due to a low temperature. In some other embodiments, when the temperature is lower than still another threshold, the electronic device boosts an output voltage of the battery 142 to avoid abnormal shutdown due to a low temperature.

The touch sensor 180K may also be referred to as a "touch panel". The touch sensor 180K may be disposed on the display 194, and the touch sensor 180K and the display 194 constitute a touchscreen. The touch sensor 180K is configured to detect a touch operation performed on or near the touch sensor 180K. The touch sensor may transfer the detected touch operation to the application processor, to determine a type of a touch event. Visual output related to the touch operation may be provided on the display 194. In some other embodiments, the touch sensor 180K may alternatively be disposed on a surface of the electronic device at a position different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure signal obtained by the bone conduction sensor 180M, to implement a heart rate detection function.

The button 190 includes a power button, a volume button, and the like. The button 190 may be a mechanical button, or may be a touch button. The electronic device may receive a key input, and generate a key signal input related to user settings and function control of the electronic device.

The motor 191 may generate a vibration prompt. The motor 191 may be configured to produce an incoming call vibration prompt and a touch vibration feedback. For example, touch operations performed on different applications (for example, photo taking and audio playing) may correspond to different vibration feedback effects. The motor 191 may also correspond to different vibration feedback effects for touch operations performed on different areas of the display 194. Different application scenarios (for example, a time prompt, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is used to connect to a SIM card. The SIM card may be inserted in the SIM card interface 195 or removed from the SIM card interface 195, to implement contact with or separation from the electronic device. The electronic device may support one or N SIM card interfaces, and N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 is applicable to different types of SIM cards. The SIM card interface 195 is also applicable to an external storage card. The electronic device interacts with a network by using the SIM card, to implement functions such as a call and data communication. In some embodiments, the electronic device uses an eSIM card, namely, an embedded SIM card. The eSIM card may be embedded into the electronic device, and cannot be detached from the electronic device.

All methods in the following embodiments may be implemented in the electronic device having the foregoing hardware structure.

Figure 9:
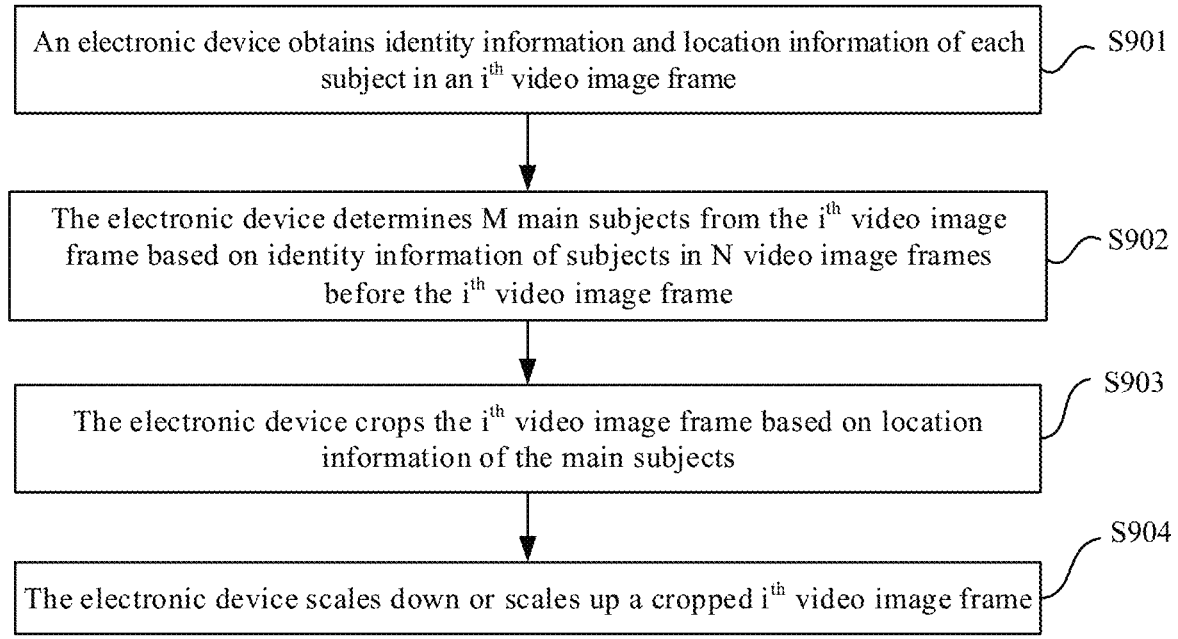
FIG. 9 is a schematic flowchart of a video image processing method according to an embodiment of this application.

FIG. 9 is a schematic flowchart of a video image processing method according to an embodiment of this application. In this application, an electronic device processes a video stream in a video call or video surveillance by frame, and processes each video image frame based on the image processing method provided in this application. The electronic device processes each image frame in a same manner. In the following embodiment, only a detailed process in which the electronic device processes an $i^{th}$ video image frame is described, and details are not described herein again. The $i^{th}$ video image frame is any video image frame in the video stream. As shown in FIG. 9, the method may include the following steps.

S901: An electronic device obtains identity information and location information of each subject in an $i^{th}$ video image frame, where i is greater than 1, and i is less than or equal to a total frame quantity of a video stream.

For example, i may be greater than or equal to X, and X is a frame quantity threshold for starting to perform the video image processing method provided in this embodiment of this application in a preconfigured video stream.

Specifically, in S901, the electronic device may identify subjects in the $i^{th}$ video image frame by using a human body detection and tracking algorithm, and one or more subjects are identified. The identity information and the location information of each subject may be obtained when the subjects are identified.

It should be noted that the human body detection and tracking algorithm is an image processing technology, and is used to identify a subject in an image. Specific implementation of the human body detection and tracking algorithm is not limited in this embodiment of this application. For example, the human body detection and tracking algorithm may be a YOLO algorithm, an SSD algorithm, or the like.

Specifically, identity information of one subject may be used to uniquely indicate a same subject in different frames. The identity information may be symbolic information that is of the subject and that is obtained by using the detection and tracking algorithm, that is, each subject has different characteristic information. Alternatively, the identity information may be a subject number corresponding to characteristic information.

Location information of a subject may be a unique coordinate value of one or more key points of the subject in a video image.

Figure 16:
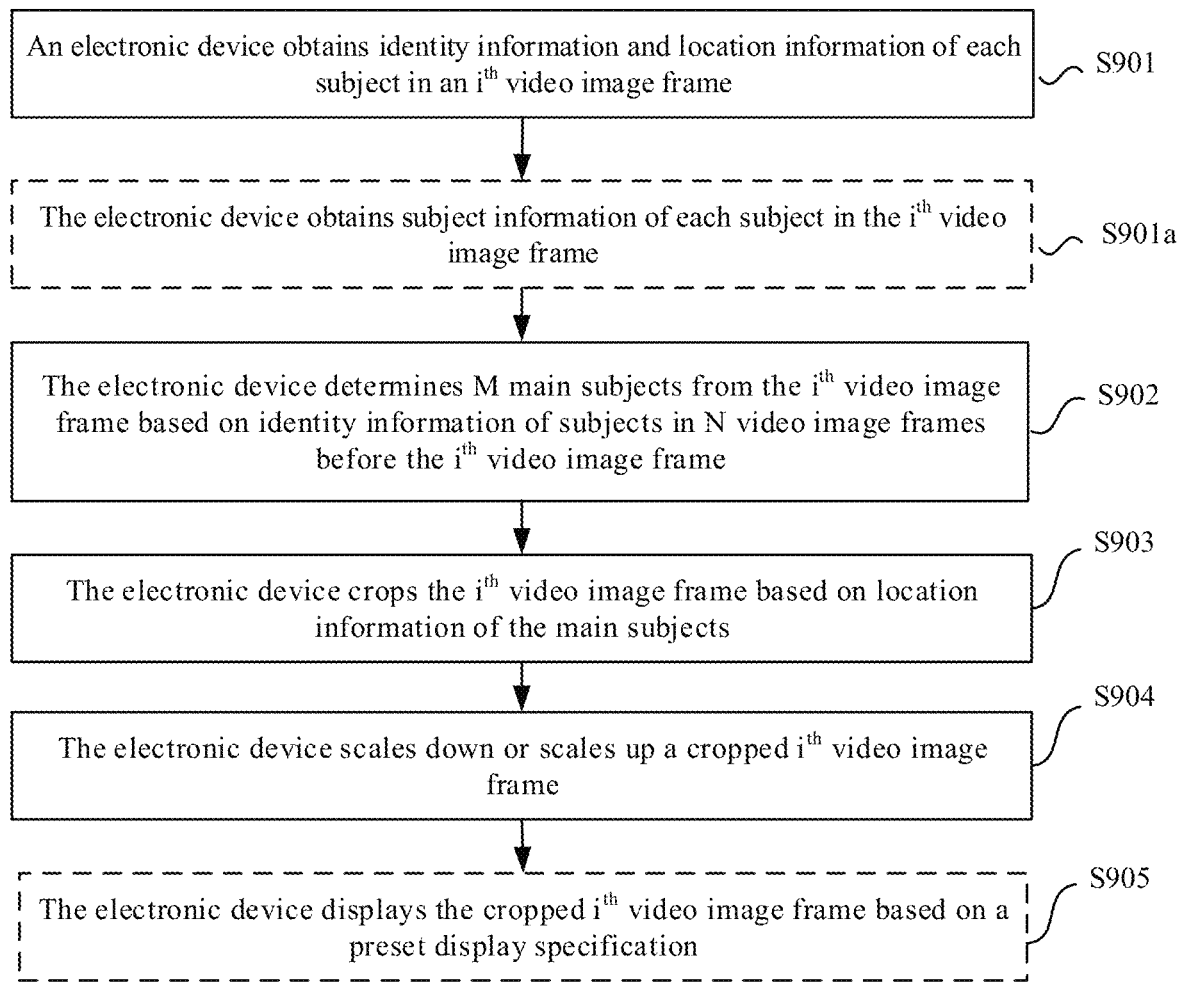
FIG. 16 is a schematic flowchart of another video image processing method according to an embodiment of this application.

Further, as shown in FIG. 16, the video processing method provided in this embodiment of this application may further include S901a.

S901a: The electronic device obtains subject information of each subject in the $i^{th}$ video image frame.

The subject information may include one or more of the following information: information about whether a subject speaks and priority information. In actual application, content included in the subject information may not be limited by the content in this specification, and is configured based on an actual requirement.

The information about whether a subject speaks is used to indicate that a subject in a video image is talking or is not talking. The information about whether a subject speaks may be obtained by combining an audio processing technology with a mouth shape of a subject in a video image, or the information about whether a subject speaks may be obtained by directly using a mouth shape of a subject in a video image.

The priority information is used to indicate importance of a subject in a video image, and priority information of different subjects that use a device may be preconfigured to correspond to identity information of the subjects. Then, when each video image frame is processed, the preconfigured priority information is searched for when the identity information of the subject is obtained, to obtain the priority information of the subject. Alternatively, priority information entered by a user for different subjects in a video image may be received. Alternatively, the priority information may be obtained by converting the information about whether a subject speaks. For example, a priority of a subject that speaks is higher than a priority of a subject that does not speak, and a priority of a subject that speaks for a long time is higher than a priority of a subject that speaks for a short time.

For example, the electronic device stores picture information of different subjects and corresponding priority information. When video image processing is performed, if similarity between a subject identified in a video image and a stored picture is greater than a similarity threshold, priority information corresponding to the stored picture is used as priority information of the identified subject.

The picture information of different subjects and the corresponding priority information that are stored in the electronic device may be stored as follows: A user enters a function configuration interface of the electronic device, and manually enters pictures of different subjects and priority information into the electronic device for storage; the electronic device records picture information of different subjects and corresponding priority information that are obtained in a historical video collection and display process; or a user manually enters pictures of different subjects and priority information, and the electronic device dynamically updates the pictures of different subjects and corresponding priority information when performing video collection and display each time.

Optionally, when the priority information is entered by a user of the electronic device, the video image processing method provided in this application may further include: receiving priority information entered by a user.

A process in which the user enters the priority information is described herein by using an example.

Figure 10:
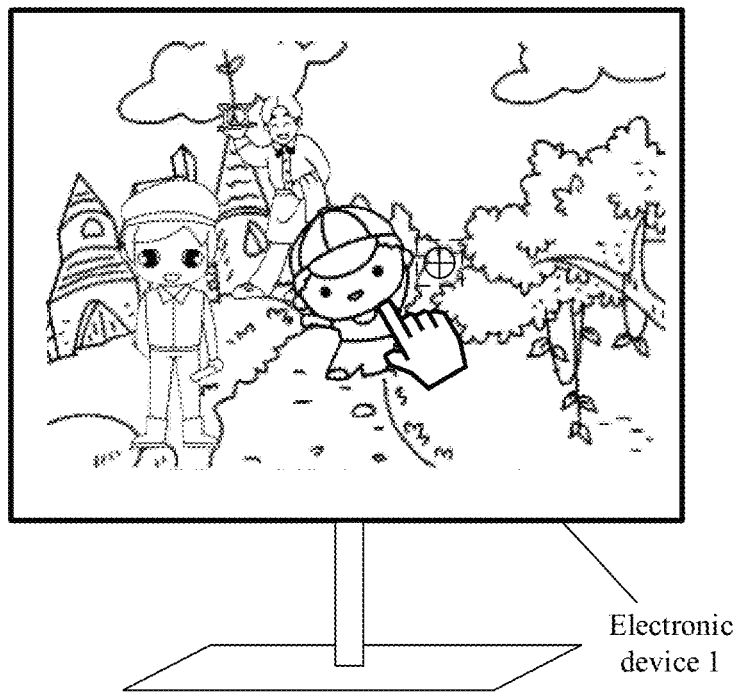
FIG. 10 is a schematic diagram of a video call interface according to an embodiment of this application.
Figure 11:
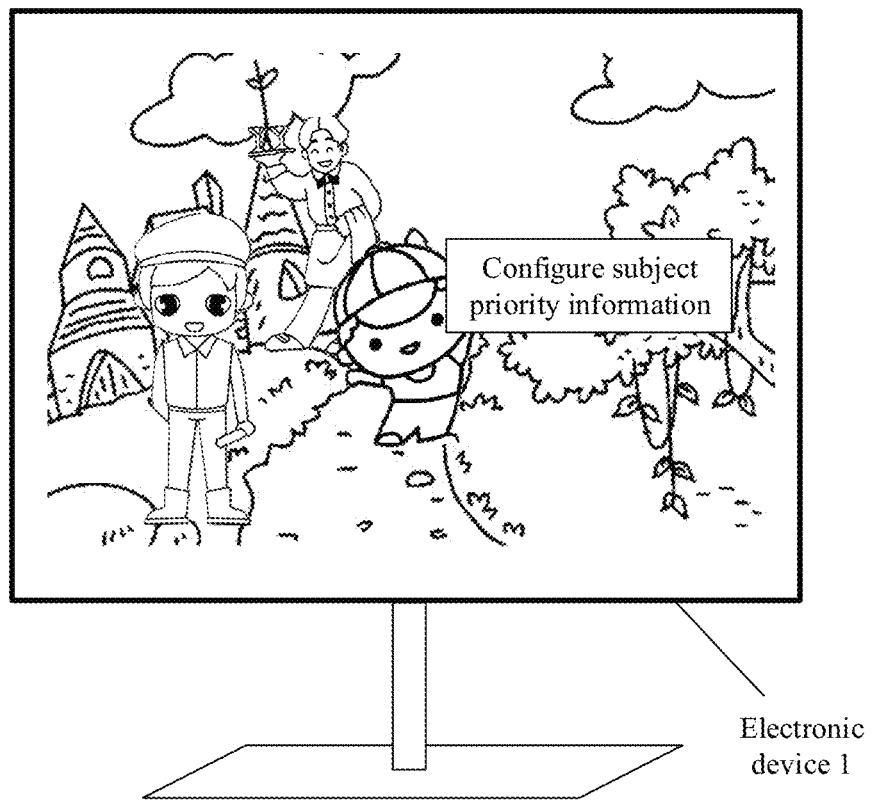
FIG. 11 is a schematic diagram of another video call interface according to an embodiment of this application.
Figure 12:
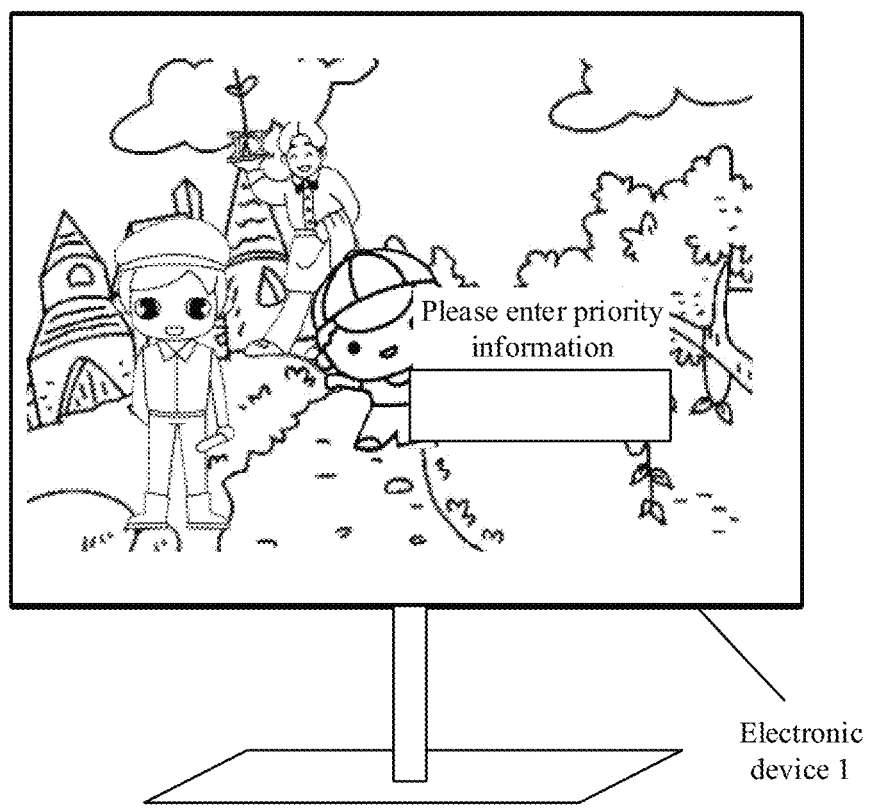
FIG. 12 is a schematic diagram of still another video call interface according to an embodiment of this application.

For example, when the user configures priority information for a subject identified in the video image, the user may long press a screen of the electronic device to display a configuration menu, and perform configuration. As shown in FIG. 10, it is assumed that the video image collected by the electronic device is a picture in FIG. 10, the user long presses a location of a subject in the picture (a finger location in FIG. 10 is used to indicate the user to long press the location, which is merely an example but not a limitation), the electronic device displays a configuration menu shown in FIG. 11 for the user, and the user may select "Configure subject priority information" in the configuration menu shown in FIG. 11, to perform priority configuration. When the user selects "Configure subject priority information" in FIG. 11, the electronic device displays an interaction interface shown in FIG. 12. The user enters priority information of the subject on the interface; and the electronic device simultaneously captures a picture of the subject, and records and stores the picture and importance entered by the user on the interface in FIG. 12.

S902: The electronic device determines M main subjects from the $i^{th}$ video image frame based on identity information of subjects in N video image frames before the $i^{th}$ video image frame.

The identity information of the subjects in the N video image frames includes identity information of the M main subjects. It should be understood that the identity information of all the subjects in the N video image frames includes the identity information of the M main subjects, that is, the M main subjects appear in the first N video image frames.

The identity information of the subjects in the N video image frames before the $i^{th}$ video image frame is saved after the electronic device performs S901 to process a corresponding video image. A specific process is the same as that of S901, and details are not described again.

Specifically, N is greater than or equal to 1. Optionally, N may be less than or equal to i−1. In actual application, a specific value of N may be configured based on an actual requirement.

Optionally, the N video image frames before the $i^{th}$ video image frame may be the first N video image frames that are in the video stream and that are adjacent to the $i^{th}$ video image frame, may be the first N video image frames that are in the video stream and that are not adjacent to the $i^{th}$ video image frame, or may be video image frames within a preset time period in the video stream. In this embodiment of this application, specific locations of the N video image frames in the video stream before the $i^{th}$ video image frame are not limited.

In a possible implementation, in a process of processing a video stream, a value of N may be alternatively a dynamic value. When i is less than a configuration threshold, N is equal to i−1; when i is greater than the configuration threshold, N is a fixed value less than i−1; and when i is equal to the configuration threshold, N may be equal to i−1, or may be a fixed value less than i−1. This is not specifically limited in this application.

When N is a fixed value less than i−1, a specific value of the fixed value may be configured based on experience. This is not specifically limited in this application.

M may be one or more. The value of M is not specifically limited in this embodiment of this application.

In a possible implementation, M may be a total quantity of main subjects determined in each video image frame.

In another possible implementation, M may be a preconfigured fixed value.

In a possible implementation, S902 may be implemented as follows: The electronic device determines the M main subjects from the $i^{th}$ video image frame based on the identity information of each subject in the $i^{th}$ video image frame and the identity information of the subjects in the N video image frames before the $i^{th}$ video image frame. For example, the electronic device may compare the identity information of each subject in the $i^{th}$ video image frame with the identity information of the subjects in the N video image frames before the $i^{th}$ video image frame, determine, as candidate subjects, subjects corresponding to a matched portion between the identity information of the subjects in the N video image frames before the $i^{th}$ video image frame and the identity information of each subject in the $i^{th}$ video image frame, and determine the main subjects from the candidate subjects.

Specifically, in S902, the electronic device may determine subjects that appear in the first N video image frames (identified based on the identity information), that appear in the $i^{th}$ video image frame, and that meet a preset condition as the main subjects. The preset condition may be configured based on an actual case. This is not limited in this application. For example, the preset condition may be that a quantity of frames in which the subject has appeared in the first N video image frames is greater than or equal to a threshold.

Specifically, S902 may be implemented by but is not limited to the following several possible implementations.

Implementation 1: The electronic device determines one or more subjects in the $i^{th}$ video image frame as the M main subjects, where among the N video image frames, a quantity of image frames including the subjects is greater than or equal to a first preset threshold.

Specifically, a process of determining whether a subject in the $i^{th}$ video image frame is a main subject may include: counting, among the N video image frames, a cumulative quantity of frames including the subject, and if the cumulative quantity of frames including the subject is greater than or equal to the first preset threshold, determining that the subject is a main subject. Whether the subject appears in a video image frame may be specifically implemented by determining whether the video image frame includes a subject that has the same identity information as the subject.

A cumulative quantity of frames including a subject is a quantity of consecutive video image frames that are in the N video image frames before the $i^{th}$ video image frame and in which the subject appears; and the consecutive video image frames may include S video image frames in which the subject does not appear, where S is greater than or equal to 0 and less than or equal to a preset frame quantity.

Implementation 2: The electronic device divides the $i^{th}$ video image frame into Y areas, and configures a preset threshold corresponding to each area, where a preset threshold corresponding to a $k^{th}$ area is a $k^{th}$ preset threshold; the $k^{th}$ area is any area in the Y areas; Y is greater than or equal to 2; and k is greater than or equal to 1 and less than or equal to Y; and determines one or more subjects in the $i^{th}$ video image frame as the M main subjects, where among the N video image frames, a quantity of video image frames including the subjects is greater than or equal to preset thresholds corresponding to areas in which the subjects are located.

In Implementation 2, preset thresholds corresponding to different areas may be different.

Figure 13:
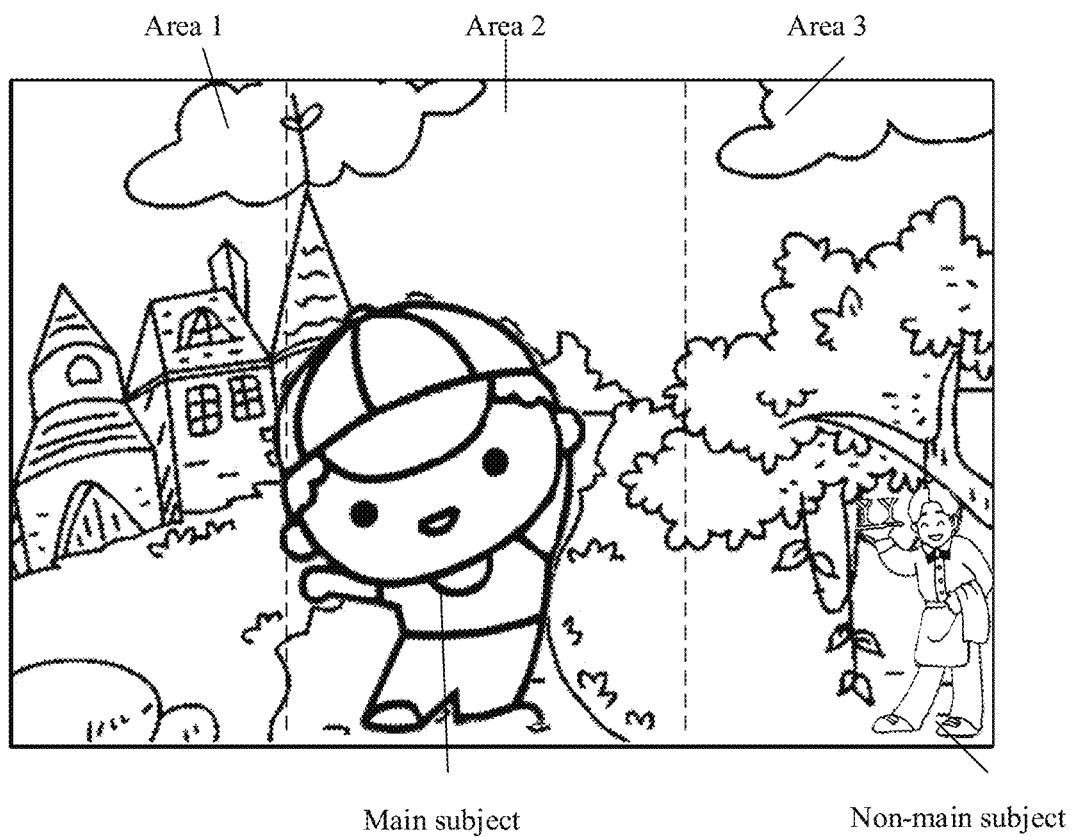
FIG. 13 is a schematic diagram of another video image processing according to an embodiment of this application.

For example, when Y is equal to 3, the video image is divided into three preset areas shown in FIG. 13, and the three preset areas are respectively recorded as an area 1, an area 2, and an area 3 from the left to the right. Preset thresholds configured for the areas are respectively recorded as a threshold 1, a threshold 2, and a threshold 3, where the threshold 1, the threshold 2, and the threshold 3 are different from each other. In this case, if it is identified that a subject A is located in the area 2 in the $i^{th}$ video image frame, a cumulative quantity of frames including the subject A is greater than the threshold 2, and the subject A is determined as a main subject. If it is identified that a subject B is located in the area 3 in the $i^{th}$ video image frame, a cumulative quantity of frames including the subject B is less than the threshold 3, and the subject B is not a main subject.

It should be noted that Y may be alternatively 1. In this case, specific implementation of Implementation 2 is the same as that of Implementation 1, and details are not described again.

Implementation 3: Corresponding to S901a in which the subject information of each subject in the $i^{th}$ video image frame is obtained, S902 is specifically implemented as follows:

determining one or more subjects in the $i^{th}$ video image frame as the M main subjects, where among the N video image frames, a quantity of video image frames including the subjects that speak is greater than or equal to a second preset threshold; determining one or more subjects in the $i^{th}$ video image frame as the M main subjects, where among the N video image frames, priority information of the subjects is greater than a third preset threshold; or selecting, based on the priority information, the most important M subjects from one or more subjects in the $i^{th}$ video image frame as the M main subjects, where among the N video image frames, a quantity of video image frames including the subjects that speak is greater than or equal to a second preset threshold.

It should be noted that values of the foregoing preset thresholds may be configured based on an actual requirement. This is not specifically limited in this embodiment of this application. The cumulative quantity of frames including a subject may also be converted into cumulative duration that a subject appears, and content of a corresponding preset threshold may be a time threshold.

S903: The electronic device crops the $i^{th}$ video image frame based on location information of the main subjects.

A cropped $i^{th}$ video image frame includes the M main subjects. It should be understood that the cropped $i^{th}$ video image frame may completely display the M main subjects.

Specifically, that the electronic device crops the $i^{th}$ video image frame based on location information of the main subjects may be specifically implemented by: determining a cropping box, where the cropping box includes a minimum external rectangular frame of the M main subjects; and cropping the $i^{th}$ video image frame by using the cropping box.

A length-to-width ratio of the cropping box should be adapted to a preset display specification.

It should be noted that the cropping box includes a minimum external rectangular frame of the M main subjects may be understood as that the determined cropping box includes the minimum external rectangular frame of the M main subjects as complete as possible.

Optionally, specific implementation of determining of the cropping box may include but is not limited to the following implementation solutions.

Implementation solution 1: The electronic device determines a to-be-selected cropping box as the cropping box.

In a possible implementation, the to-be-selected cropping box may be the minimum external rectangular frame of the M main subjects plus a cropping margin, and the cropping margin may be greater than or equal to 0.

Figure 5:
FIG. 5 is a schematic diagram of a video image processing result according to an embodiment of this application.
Figure 6:
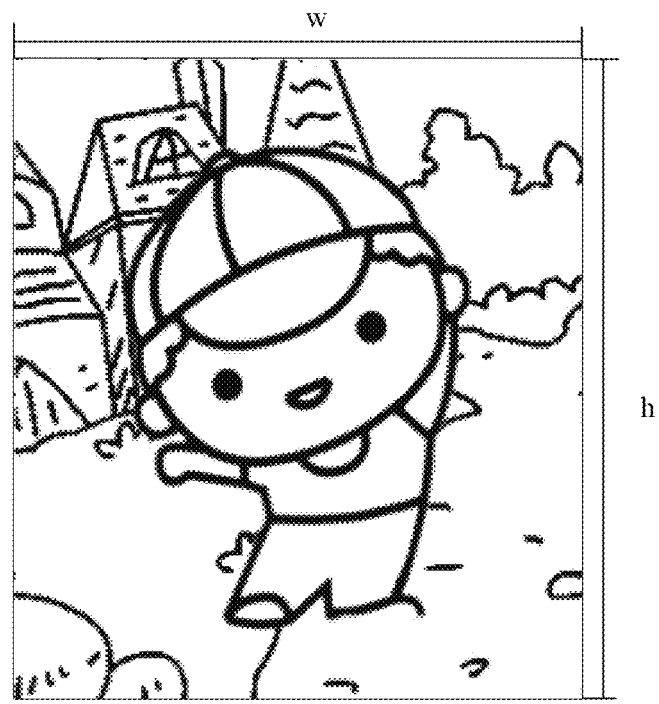
FIG. 6 is a schematic diagram of still another video image processing result according to an embodiment of this application.

For example, for a specific process in which the electronic device uses the minimum external rectangular frame as the determined cropping box to crop the video image, refer to FIG. 4 and FIG. 5.

In another possible implementation, when the subject information includes the priority information, the to-be-selected cropping box may be an external rectangular frame plus a cropping margin, where the external rectangular frame is centered on a subject with a highest priority in the M main subjects and includes the M main subjects.

Figure 14:
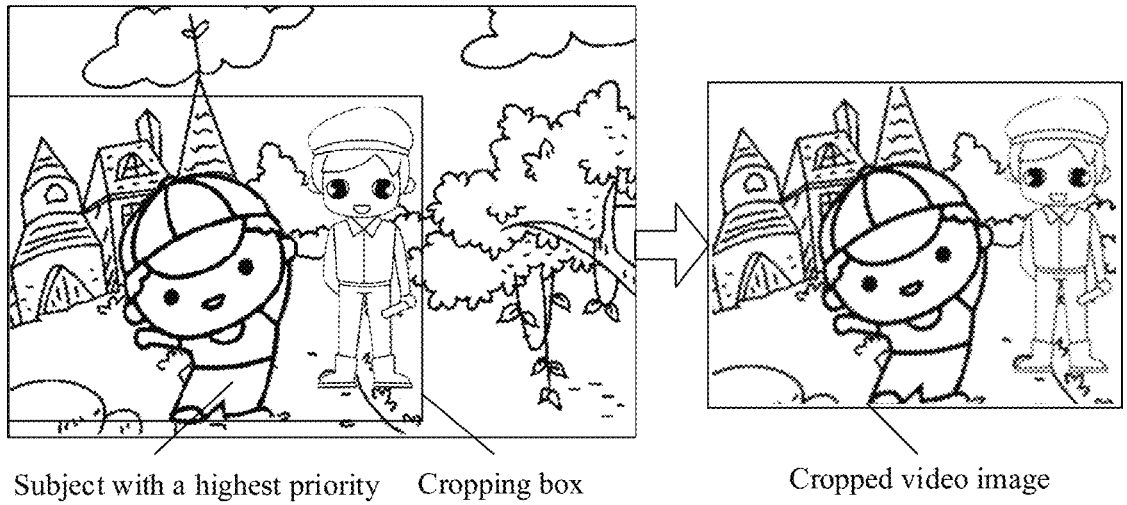
FIG. 14 is a schematic diagram of still another video image processing according to an embodiment of this application.

For example, FIG. 14 shows a scenario in which the determined cropping box is an external rectangular frame that is centered on a subject with a highest priority in the M main subjects and that includes the M main subjects, and the $i^{th}$ video image frame is cropped to completely display the main subjects.

In another possible implementation, when the subject information includes the information about whether a subject speaks, the to-be-selected cropping box may be an external rectangular frame plus a cropping margin, where the external rectangular frame is centered on a speaking subject in the M main subjects and includes the M main subjects.

Figure 15:
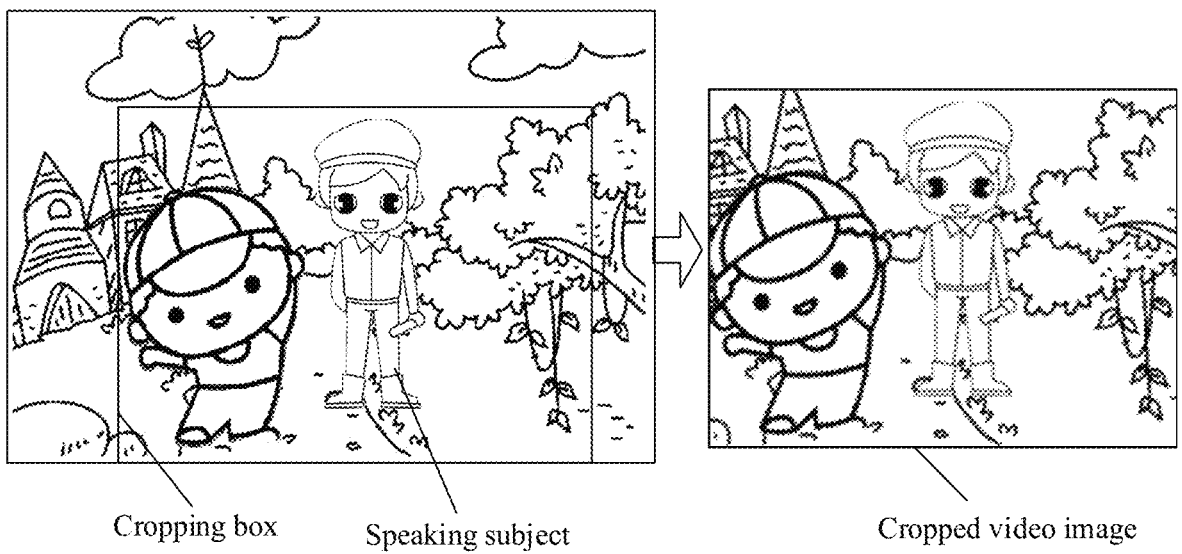
FIG. 15 is a schematic diagram of still another video image processing according to an embodiment of this application.

For example, FIG. 15 shows a scenario in which the determined cropping box is an external rectangular frame that is centered on a speaking subject in the M main subjects and that includes the M main subjects, and the $i^{th}$ video image frame is cropped to completely display the main subjects.

Certainly, a range of the to-be-selected cropping box may be configured based on an actual requirement. This is not specifically limited in this embodiment of this application.

Implementation solution 2: The electronic device determines a cropping box of the $i^{th}$ video image frame based on a first to-be-selected cropping box and a cropping box of a previous video image frame.

The first to-be-selected cropping box in Implementation solution 2 is the same as the to-be-selected cropping box in Implementation solution 1.

Specifically, in Implementation solution 2, the electronic device first obtains a distance between a center point of the first to-be-selected cropping box and a center point of the cropping box of the previous video image frame, where the first to-be-selected cropping box includes the minimum external rectangular frame of the M main subjects; if the distance is greater than or equal to a distance threshold, determines a second cropping box, where a center point of the second cropping box is the center point of the cropping box of the previous video image frame plus an offset, and a size of the second cropping box is the same as a size of the cropping box of the previous video image frame; and if the second cropping box includes the minimum external rectangular frame of the M main subjects, uses a third cropping box as the cropping box, where the third cropping box is the second cropping box, or the third cropping box is a cropping box obtained by narrowing the second cropping box to include the minimum external rectangular frame; or if the second cropping box does not completely include the minimum external rectangular frame, enlarges the second cropping box to include the minimum external rectangular frame, and uses an enlarged second cropping box as the cropping box.

The offset may be a preset value, may be the distance between the center point of the first to-be-selected cropping box and the center point of the cropping box of the previous video image frame multiplied by a weighted value, or may be obtained based on a preset algorithm. This is not specifically limited in this embodiment of this application.

For example, enlarging or narrowing the to-be-selected cropping box may be implemented by enlarging or narrowing one or more edges of the to-be-selected cropping box outward or inward.

Further, if the distance is less than the distance threshold, the electronic device may directly use the to-be-selected cropping box as the determined cropping box.

A distance between a center point of the to-be-selected cropping box and the center point of the cropping box of the previous video image frame may be a linear distance or the like. This is not specifically limited in this embodiment of this application.

S904: The electronic device scales down or scales up the cropped $i^{th}$ video image frame.

Specifically, the electronic device performs S904, so that the display displays the cropped $i^{th}$ video image frame based on the preset display specification. In S904, the electronic device scales down or scales up the cropped $i^{th}$ video image frame in S903 based on the preset display specification.

The preset display specification may be a specification adapted to the display, or a fixed screen-to-body ratio.

For example, if resolution of the cropped $i^{th}$ video image frame in S903 is less than the preset display specification, the electronic device scales up the cropped $i^{th}$ video image frame into an image of the preset display specification in S904; if resolution of the cropped $i^{th}$ video image frame in S903 is greater than the preset display specification, the electronic device scales down the cropped $i^{th}$ video image frame into an image of the preset display specification in S904; or if resolution of the cropped $i^{th}$ video image frame in S903 is equal to the preset display specification, the electronic device uses the cropped $i^{th}$ video image frame as an image of the preset display specification in S904.

Further, after S904, the electronic device may continue to perform a process of S901 to S904 on a subsequent video image frame, that is, may traverse each video image frame in the video stream, to perform frame-by-frame processing, and process a frame when the frame is obtained, until the video stream ends.

According to the video image processing method provided in this application, a main subject of a video image is determined in combination with identity information of a subject in a current image frame and identity information of subjects in N video image frames before the current frame, so that accuracy of a subject sensing process is greatly improved, and accuracy of a determined location of the main subject is correspondingly improved. In this way, it can be ensured that the main subject can be completely displayed in a small-resolution image obtained after cropping and scaling based on the main subject, to ensure consecutive presented pictures of the main subject, and implement, through software, a consecutive effect of "a picture moves with a subject" of pictures in an image collection and display process.

Further, the video image processing method provided in this application may further include: The electronic device obtains a $j^{th}$ video image frame, where j is less than or equal to X, and X is greater than 1; obtains and saves identity information and/or location information of each subject in the $j^{th}$ video image frame; and directly scales down the $j^{th}$ video image frame into an image of the preset display specification. The identity information and/or the location information of the $j^{th}$ video image frame may be used as reference information of a subsequent video image frame.

Certainly, the electronic device may further obtain and save subject information of each subject in the $j^{th}$ video image frame.

Further, as shown in FIG. 16, the image processing method provided in this embodiment of this application may further include S905.

S905: The electronic device displays the cropped $i^{th}$ video image frame based on the preset display specification.

In a possible implementation, the electronic device that performs the video image processing method shown in FIG. 9 or FIG. 16 may be a transmitter device in a video call. The video image processing method provided in this application may further include: The electronic device encodes an image that is of the preset display specification and that is obtained after scaling down or scaling up, and transmits an encoded image to a receiver device; and the receiver device displays the cropped $i^{th}$ video image frame based on the preset display specification. For a specific process, refer to the operating procedure of the system architecture shown in FIG. 2.

In a possible implementation, the electronic device that performs the video image processing method shown in FIG. 9 or FIG. 16 may be a transmitter device in a video call. The video image processing method provided in this application may further include: The electronic device displays the cropped $i^{th}$ video image frame based on the preset display specification, and displays a cropped video image of a peer end based on the preset display specification.

In a possible implementation, the electronic device that performs the video image processing method shown in FIG. 9 or FIG. 16 may be a receiver device in a video call. The video image processing method provided in this application may further include: The electronic device displays, by using a display apparatus, an image that is of the preset specification and that is obtained after scaling down or scaling up. For a specific process, refer to the operating procedure of the system architecture shown in FIG. 2.

The following uses a specific video call scenario as an example, to describe in detail the video image processing method provided in the embodiments of this application.

Video call applications are installed in an electronic device 1701 and an electronic device 1702. The video call application is a client that may provide a video call service to a user. The video call application installed in the electronic device 1701 and the video call application installed in the electronic device 1702 may exchange data by using an internet access video call server, to complete a video call, and provide a video call service for users who use the electronic device 1701 and the electronic device 1702.

Figure 17A:
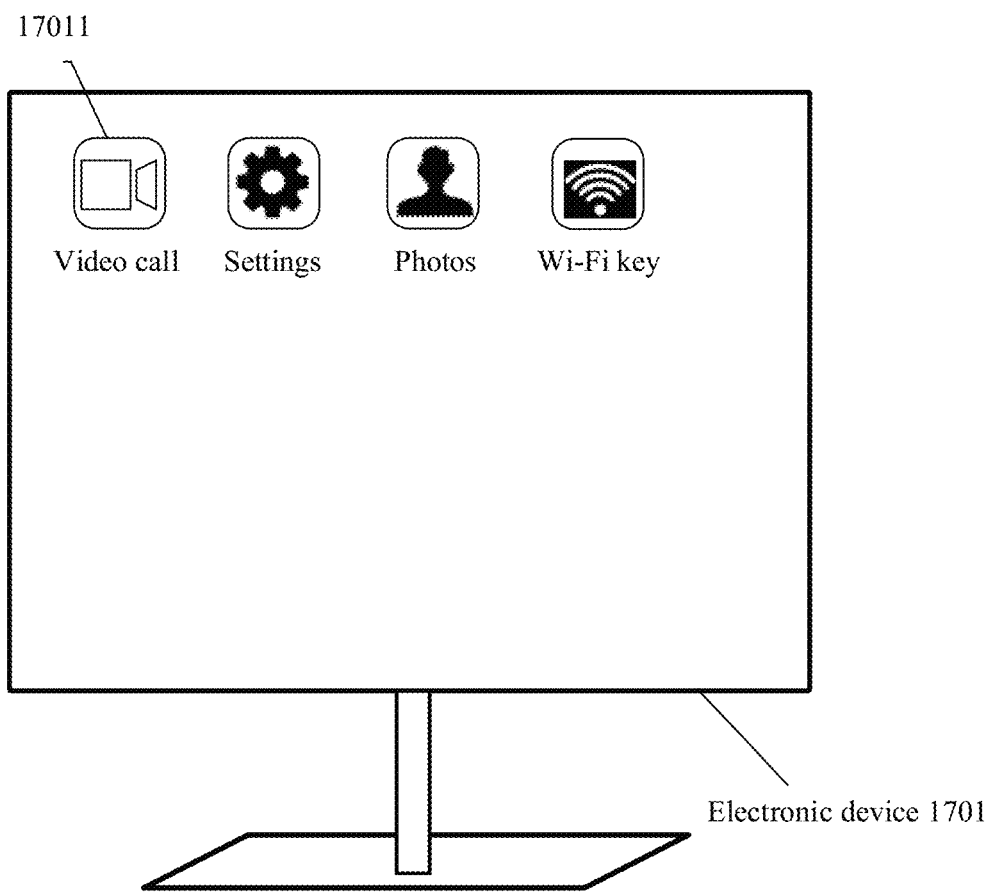
FIG. 17A is a schematic diagram of still another video call interface according to an embodiment of this application.
Figure 17B:
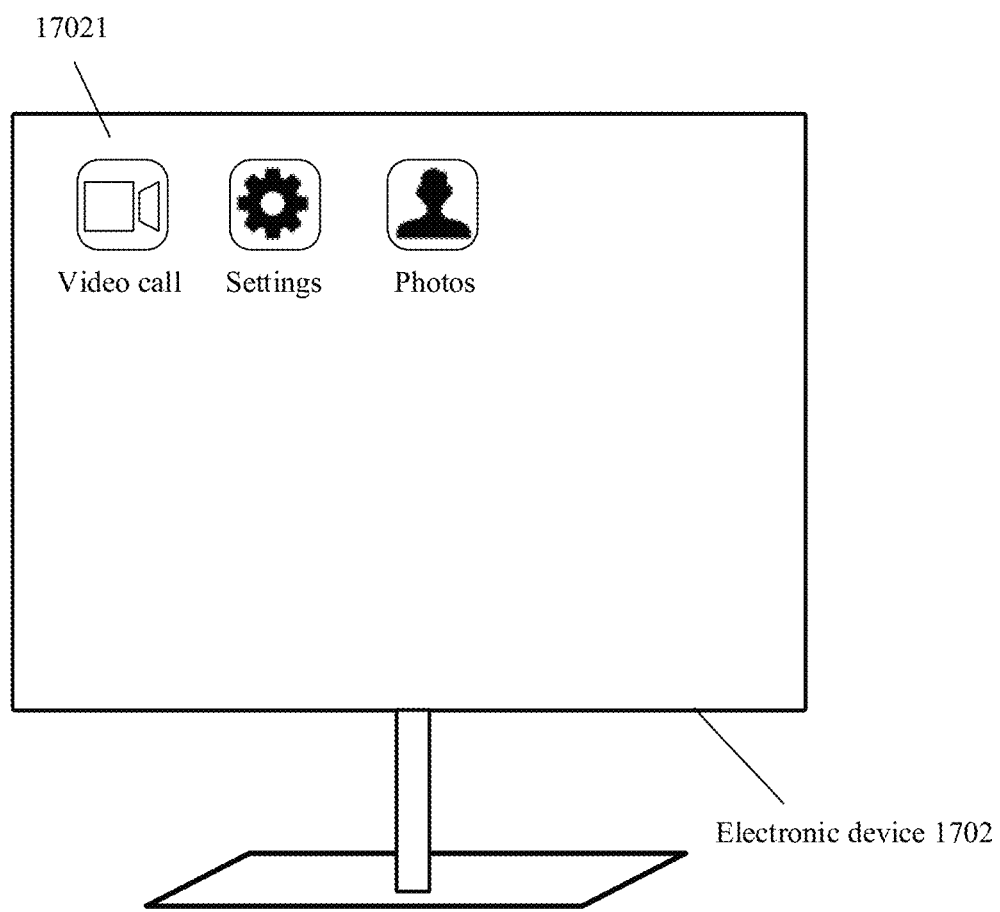
FIG. 17B is a schematic diagram of still another video call interface according to an embodiment of this application.

For example, as shown in FIG. 17A, a main interface (for example, a desktop) of the electronic device 1701 includes an application icon 17011 of the video call application. As shown in FIG. 17B, a desktop of the electronic device 1702 includes an application icon 17021 of the video call application. The electronic device 1701 invokes the video call application to perform a video call with the electronic device 1702. In a video call process, video image processing in the embodiments of this application is performed on a video image.

Figure 18A:
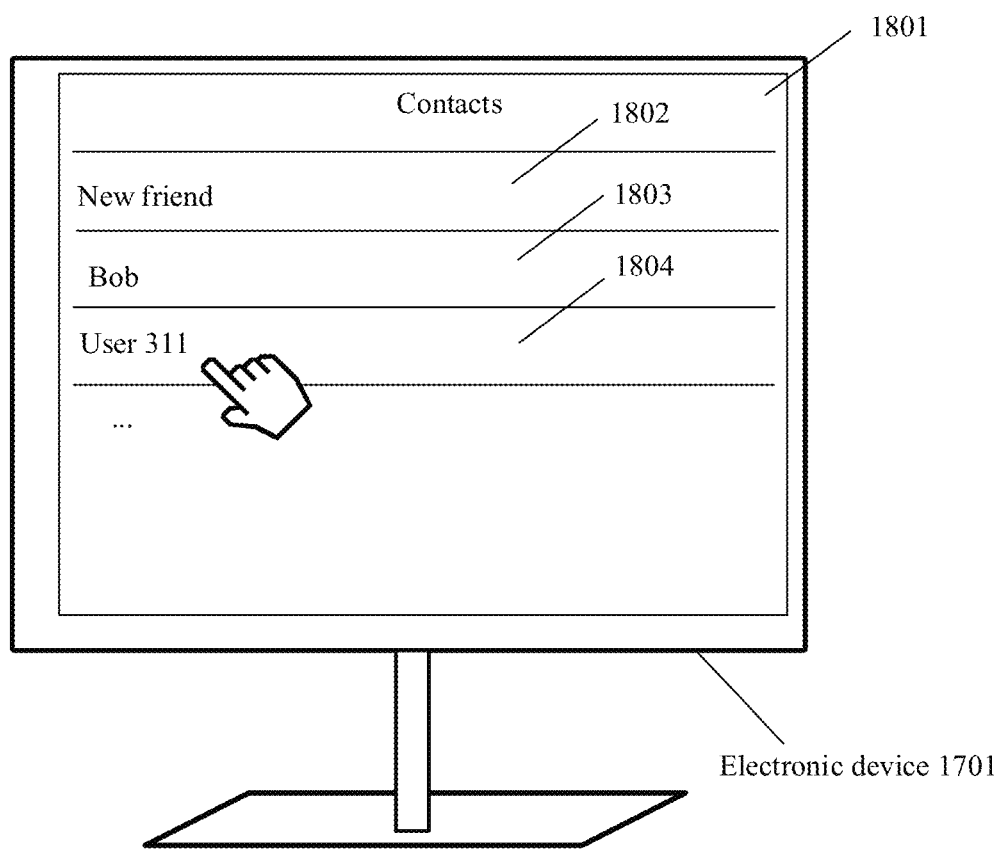
FIG. 18A is a schematic diagram of still another video call interface according to an embodiment of this application.

For example, the electronic device 1701 may receive a click operation (for example, a touch click operation or an operation performed by using a remote control apparatus) performed by the user on the application icon 17011 shown in FIG. 17A, to display a video call application interface 1801 shown in FIG. 18A. The video call application interface 1801 includes a "New friend" option 1802 and at least one contact option. For example, the at least one contact option includes a contact option 1803 of Bob and a contact option 1804 of a user 311. The "New friend" option 1802 is used to add a new contact. In response to a click operation (for example, a touch click operation or an operation performed by using a remote control apparatus) performed by the user on the contact option 1804 of the user 311, the electronic device 1701 sends a video call request to the electronic device 1702 logged in by the user 311, to perform a video call with the electronic device 1702.

Figure 18B:
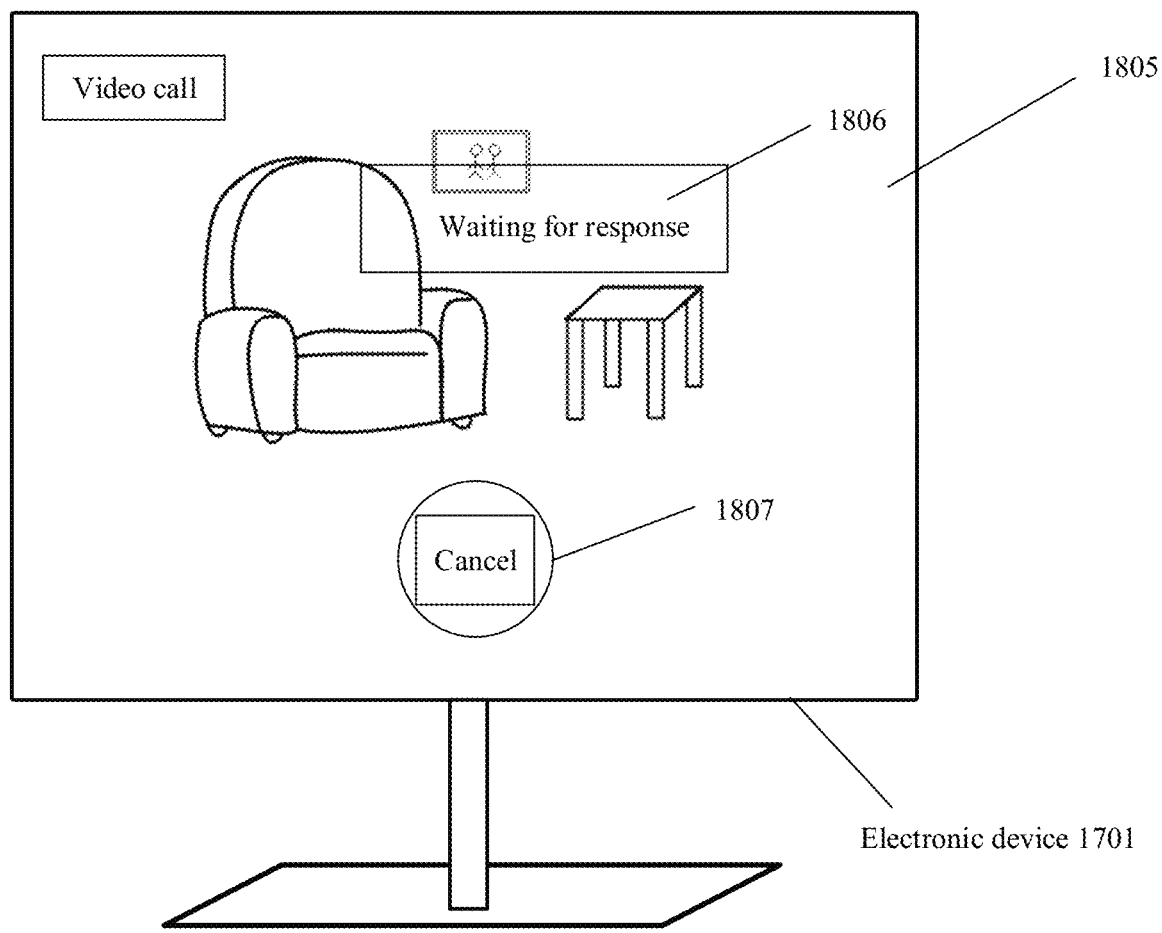
FIG. 18B is a schematic diagram of still another video call interface according to an embodiment of this application.

For example, in response to the click operation performed by the user on the contact option 1804, the electronic device 1701 may turn on a camera thereof, and collect an image of a fixed field of view as a scenario image. A display of the electronic device 1701 displays a video call interface 1805 including the scenario image collected by the camera, as shown in FIG. 18B. The video call interface 1805 includes prompting information "Waiting for response!" 1806 and a "Cancel" button 1807. The "Cancel" button 1807 is used to trigger the electronic device 1701 to cancel a video call with the electronic device 1702.

Correspondingly, the electronic device 1702 receives, from the video call server, the video call request sent by the electronic device 1701, and a display of the electronic device 1702 displays a video call interface 1808, as shown in FIG. 18C. The video call interface 1808 includes a "Receive" button 1809 and a "Reject" button 1810. The "Receive" button 1809 is used to establish a video call connection between the electronic device 1702 and the electronic device 1701. The "Reject" button 1810 is used to trigger the electronic device 1702 to reject the video call request of the electronic device 1701.

The electronic device 1702 may receive a click operation (for example, a touch click operation or an operation performed by using a remote control apparatus) performed by the user on the "Receive" button 1809, to establish a video call connection to the electronic device 1701. After a connection is established, the electronic device 1701 and the electronic device 1702 are used as two parties of a video call. The electronic device 1701 and the electronic device 1702 each may collect, by using a respective camera, an image of a fixed field of view as a scenario image, and send the scenario image to the other party after performing cropping, scaling, and encoding on each frame, and the other party displays the scenario image. The electronic device 1701 and the electronic device 1702 each may display a video image cropped by the local end when displaying a video image cropped by the peer end. In a video call process, when the electronic device 1701 sends a video image to the electronic device 1702, the electronic device 1701 is a transmitter device, and the electronic device 1702 is a receiver device; and when the electronic device 1702 sends a video image to the electronic device 1701, the electronic device 1702 is a transmitter device, and the electronic device 1701 is a receiver device. For a specific process of video image transmission between the electronic devices, refer to the operating procedure of the system architecture shown in FIG. 2.

For the first X (for example, X is equal to 120) frames of video images, the electronic device 1701 and the electronic device 1702 may directly scale down original images into images of a display specification of the peer end for encoding, and send encoded images to the peer end. The electronic device 1701 and the electronic device 1702 may process an $i^{th}$ (i is greater than 120) video image frame based on the video image processing method provided in the embodiments of this application.

Figure 19A:
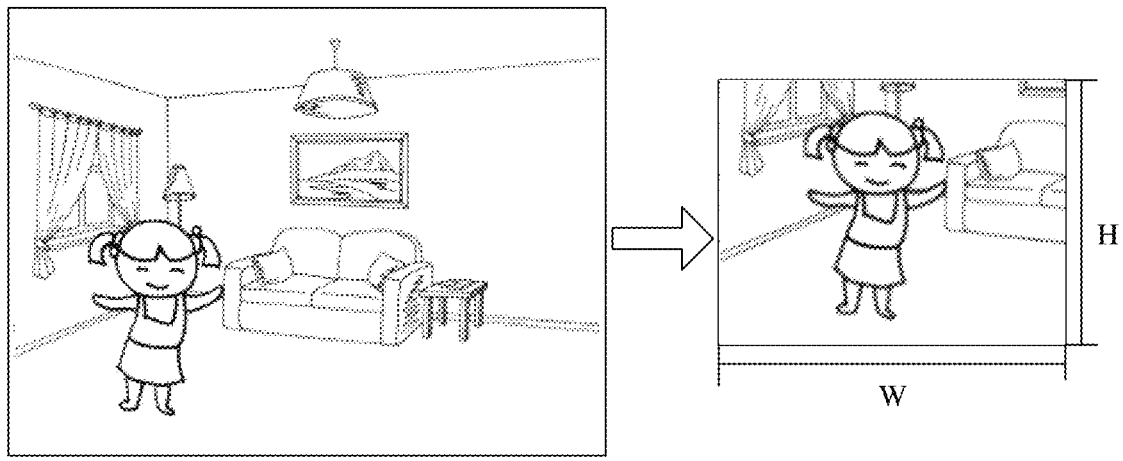
Figure 19C:
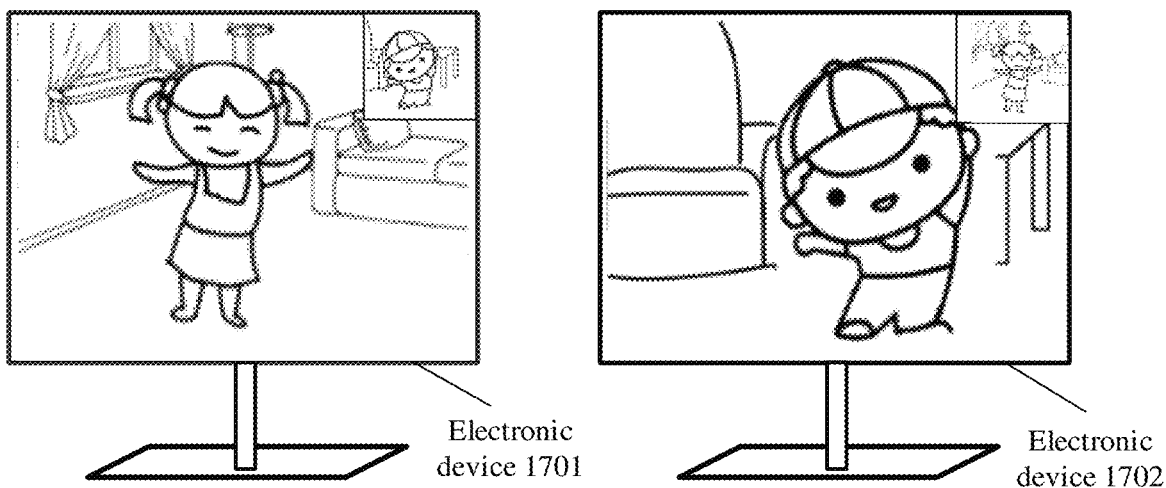
FIG. 19C is a display diagram of still another video call interface according to an embodiment of this application.

For example, at a moment in a process in which the electronic device 1701 performs a video call with the electronic device 1702, a video image of a fixed field of view collected by the camera of the electronic device 1701 is shown in FIG. 19A. The electronic device 1701 processes the video image based on the video image processing method provided in the embodiments of this application, determines a main subject, and crops and scales the video image into an image of the display specification of the electronic device 1702, as shown in FIG. 19B. The electronic device 1701 encodes the image shown in FIG. 19B, and sends an encoded image to the electronic device 1702. In addition, at this moment, a video image of a fixed field of view collected by the camera of the electronic device 1702 is shown in FIG. 19A(a). The electronic device 1702 processes the video image based on the video image processing method provided in the embodiments of this application, determines a main subject, and crops and scales the video image into an image of the display specification of the electronic device 1701, as shown in FIG. 19A(b). The electronic device 1702 encodes the image shown in FIG. 19A(b), and sends an encoded image to the electronic device 1701. In this case, display interfaces of the electronic device 1701 and the electronic device 1702 are shown in FIG. 19C. As shown in FIG. 19C, a large image of the main interface of the electronic device 1701 and a large image of the main interface of the electronic device 1702 are respectively an image collected, cropped, and scaled by the peer end, and a small image is an image that is processed based on the video image processing method provided in the embodiments of this application, in which a main subject is determined, and that is cropped and scaled to the display specification of the local end. It should be noted that when displaying an image collected by the local end, the electronic device may display an original image collected by the local end or an image that is processed based on the video image processing method provided in the embodiments of this application, in which a main subject is determined, and that is cropped and scaled to the display specification of the local end.

Figures 20A, 20B:
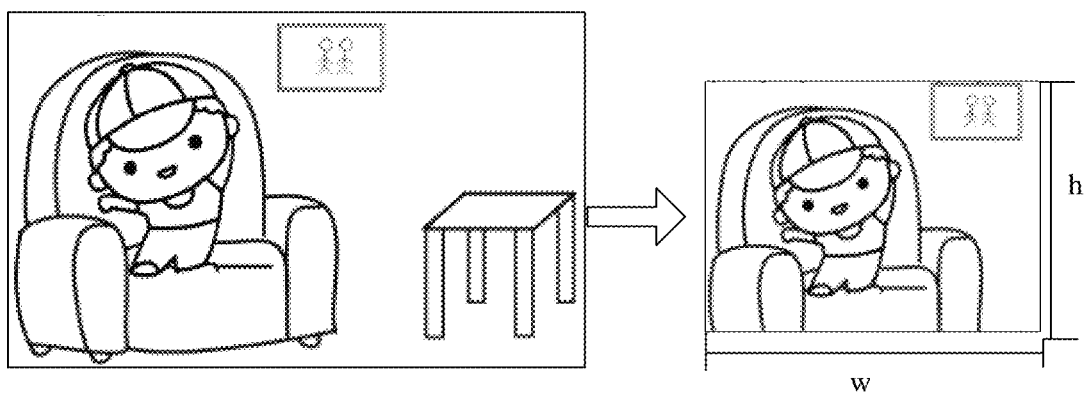
FIG. 20A and FIG. 20B are schematic diagrams of still another video image processing according to an embodiment of this application.
Figure 20C:
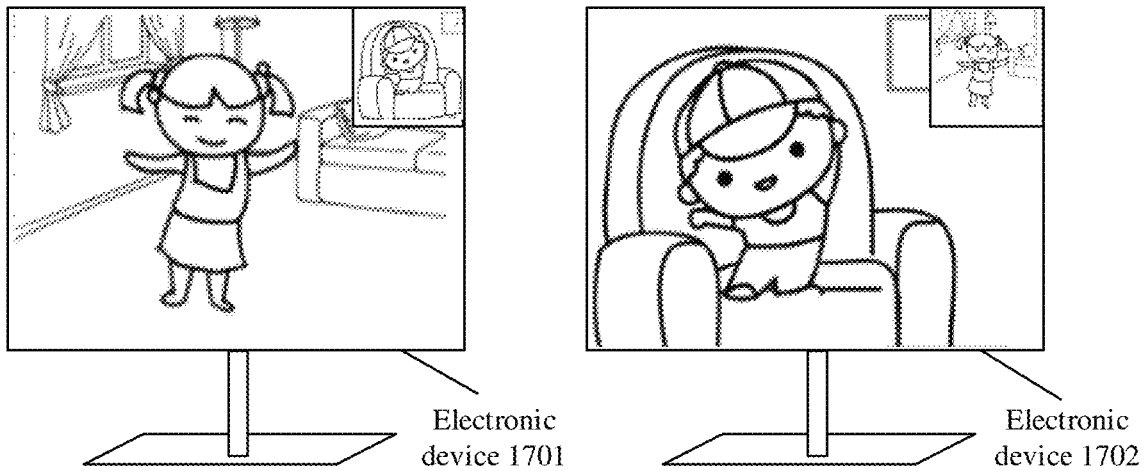
FIG. 20C is a display diagram of still another video call interface according to an embodiment of this application.

At another moment in the process in which the electronic device 1701 performs the video call with the electronic device 1702, in a collection scenario of the electronic device 1701, a location of a subject changes. In this case, a video image of a fixed field of view collected by the camera of the electronic device 1701 is shown in FIG. 20A. The electronic device 1701 processes the video image based on the video image processing method provided in the embodiments of this application, determines a main subject, and crops and scales the video image into an image of the display specification of the electronic device 1702, as shown in FIG. 20B. The electronic device 1701 encodes the image shown in FIG. 20B, and sends an encoded image to the electronic device 1702. In addition, at this moment, it is assumed that the location of the subject in a collection scenario of the electronic device 1702 is the same as that shown in FIG. 19A(a) and FIG. 19A(b) and does not change. In this case, display interfaces of the electronic device 1701 and the electronic device 1702 are shown in FIG. 20C. As shown in FIG. 20C, a large image of the main interface of the electronic device 1701 and a large image of the main interface of the electronic device 1702 are respectively an image collected, cropped, and scaled by the peer end, and a small image is an image that is processed based on the video image processing method provided in the embodiments of this application, in which a main subject is determined, and that is cropped and scaled to the display specification of the local end.

Figures 21A, 21B:
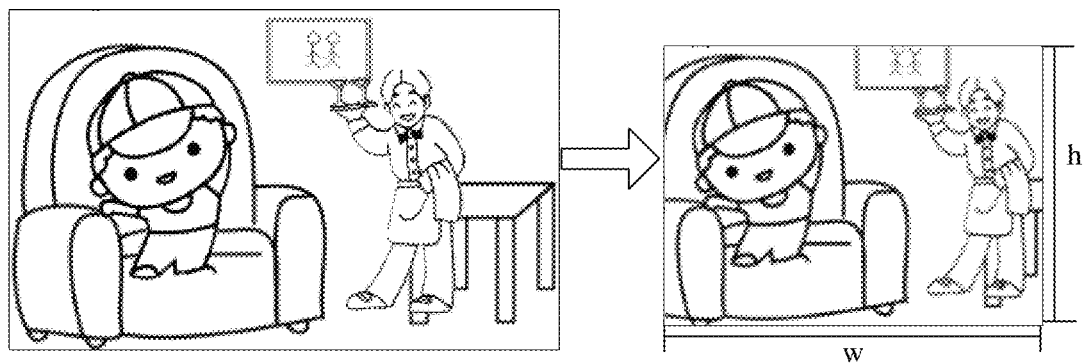
FIG. 21A and FIG. 21B are schematic diagram of still another video image processing according to an embodiment of this application.
Figure 21A:
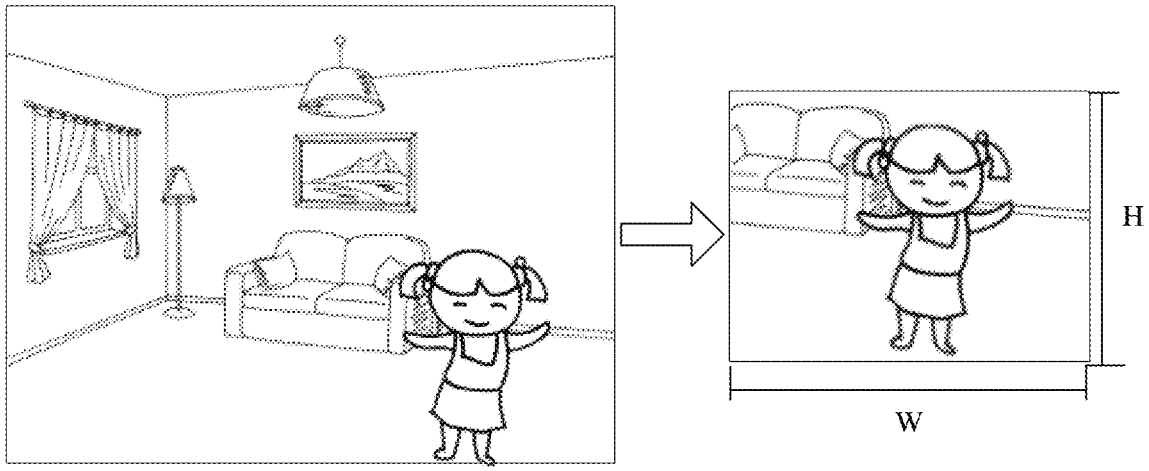
Figure 21C:
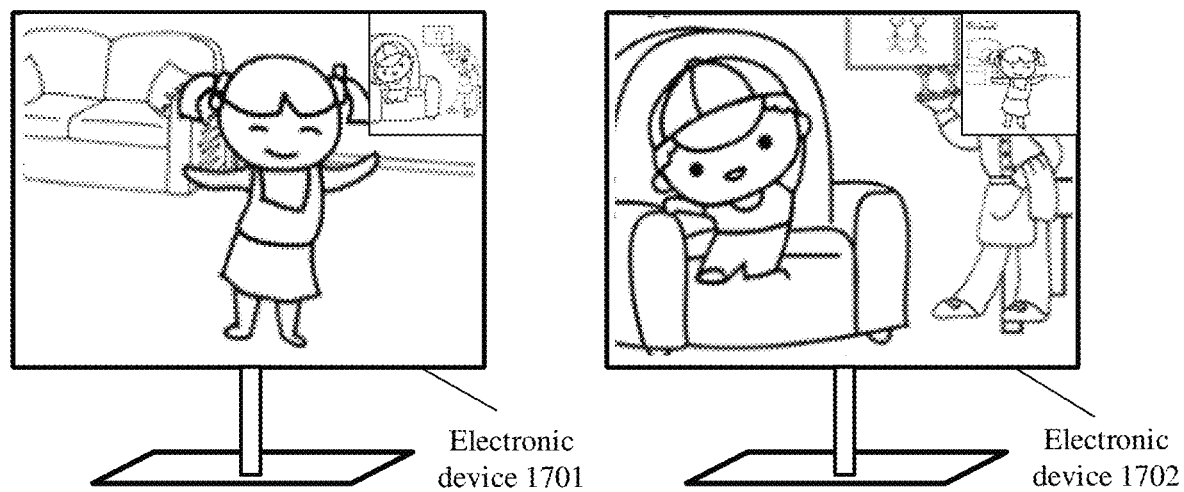
FIG. 21C is a display diagram of still another video call interface according to an embodiment of this application.

At another moment in the process in which the electronic device 1701 performs the video call with the electronic device 1702, in a collection scenario of the electronic device 1701, a subject is bigger. In this case, a video image of a fixed field of view collected by the camera of the electronic device 1701 is shown in FIG. 21A. The electronic device 1701 processes the video image based on the video image processing method provided in the embodiments of this application, determines a main subject, and crops and scales the video image into an image of the display specification of the electronic device 1702, as shown in FIG. 21B. The electronic device 1701 encodes the image shown in FIG. 21B, and sends an encoded image to the electronic device 1702. In addition, at this moment, the location of the subject changes in a collection scenario of the electronic device 1702 relative to FIG. 19A(a) and FIG. 19A(b). In this case, a video image of a fixed field of view collected by the camera of the electronic device 1702 is shown in FIG. 21A(a). The electronic device 1702 processes the video image based on the video image processing method provided in the embodiments of this application, determines a main subject, and crops and scales the video image into an image of the display specification of the electronic device 1701, as shown in FIG. 21A(b). The electronic device 1702 encodes the image shown in FIG. 21A(b), and sends an encoded image to the electronic device 1701. In this case, display interfaces of the electronic device 1701 and the electronic device 1702 are shown in FIG. 21C. As shown in FIG. 21C, a large image of the main interface of the electronic device 1701 and a large image of the main interface of the electronic device 1702 are respectively an image collected, cropped, and scaled by the peer end, and a small image is an image that is processed based on the video image processing method provided in the embodiments of this application, in which a main subject is determined, and that is cropped and scaled to the display specification of the local end.

Figures 22A, 22B:
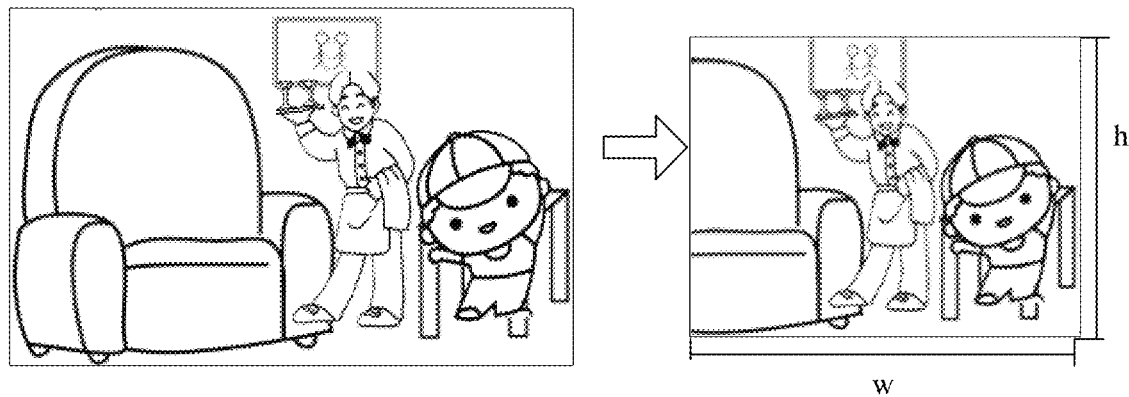
FIG. 22A and FIG. 22B are schematic diagrams of still another video image processing according to an embodiment of this application.
Figure 22C:
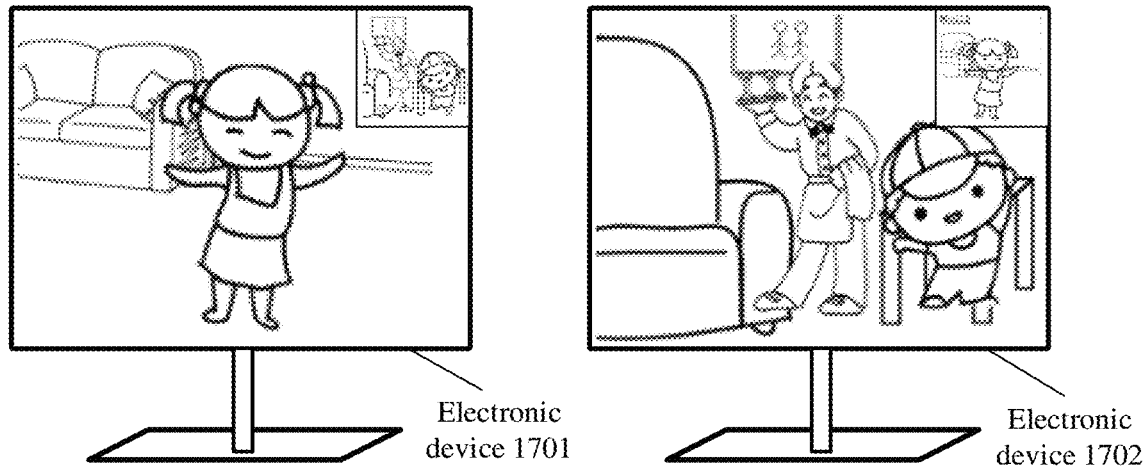
FIG. 22C is a display diagram of still another video call interface according to an embodiment of this application.

At another moment in the process in which the electronic device 1701 performs the video call with the electronic device 1702, in a collection scenario of the electronic device 1701, the subject is bigger and the location of the subject changes. In this case, a video image of a fixed field of view collected by the camera of the electronic device 1701 is shown in FIG. 22A. The electronic device 1701 processes the video image based on the video image processing method provided in the embodiments of this application, determines a main subject, and crops and scales the video image into an image of the display specification of the electronic device 1702, as shown in FIG. 22B. The electronic device 1701 encodes the image shown in FIG. 22B, and sends an encoded image to the electronic device 1702. In addition, at this moment, it is assumed that the location of the subject in a collection scenario of the electronic device 1702 is the same as that shown in FIG. 21A(a) and FIG. 21A(b) and does not change. In this case, display interfaces of the electronic device 1701 and the electronic device 1702 are shown in FIG. 22C. As shown in FIG. 22C, a large image of the main interface of the electronic device 1701 and a large image of the main interface of the electronic device 1702 are respectively an image collected, cropped, and scaled by the peer end, and a small image is an image that is processed based on the video image processing method provided in the embodiments of this application, in which a main subject is determined, and that is cropped and scaled to the display specification of the local end.

The following uses a specific surveillance scenario as an example, to describe in detail the video image processing method provided in the embodiments of this application.

It is assumed that a surveillance system includes a camera 1, a server 2, and a display device 3. The camera 1 is configured to collect a video image of a fixed field of view. The server 2 is configured to process, by using the video image processing method provided in the embodiments of this application, the video image collected by the camera 1. A processed video image may be displayed in real time by using the display device 3. Alternatively, the processed video image may be stored in a storage apparatus in the server 2, and the server 2 reads the processed video image from the storage apparatus when receiving a read instruction, to display the processed video image by using the display device 3.

Figures 23A, 23B:
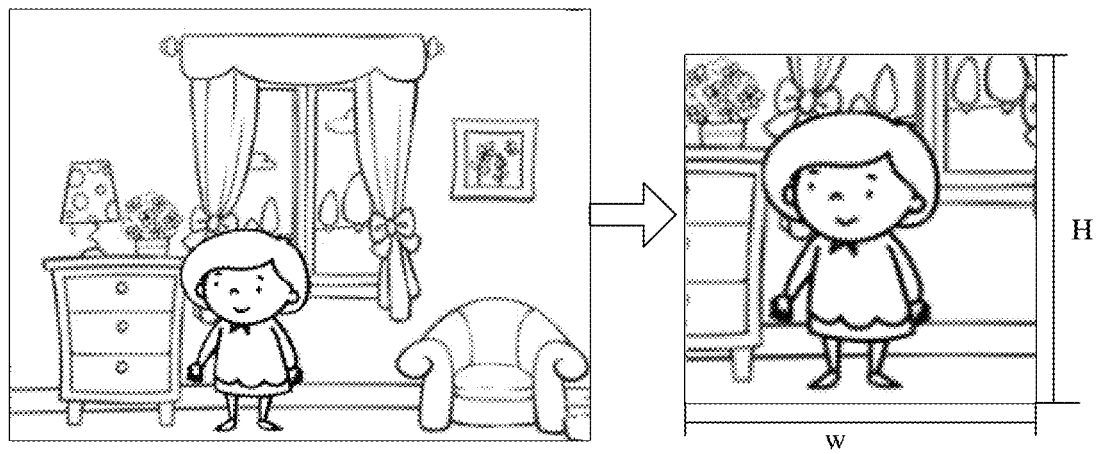
FIG. 23(a) and FIG. 23(b) are schematic diagrams of video image processing of a surveillance scenario according to an embodiment of this application.

For example, at a moment in a running process of the surveillance system, a video image of a fixed field of view collected by the camera 1 is shown in FIG. 23(a), and the camera 1 sends the collected image to the server 2. The server 2 processes the collected image based on the video image processing method provided in the embodiments of this application, determines a main subject, and crops and scales the collected image into an image of a display specification of the display device 3, as shown in FIG. 23(b). The server 2 displays the image shown in FIG. 23(b) in real time by using the display device 3. In addition, the server 2 stores the image shown in FIG. 23(b) in the storage apparatus of the server 2. When receiving an instruction for reading the video image, the server 2 reads the video image from the storage apparatus and displays the video image by using the display device 3.

Figures 24A, 24B:
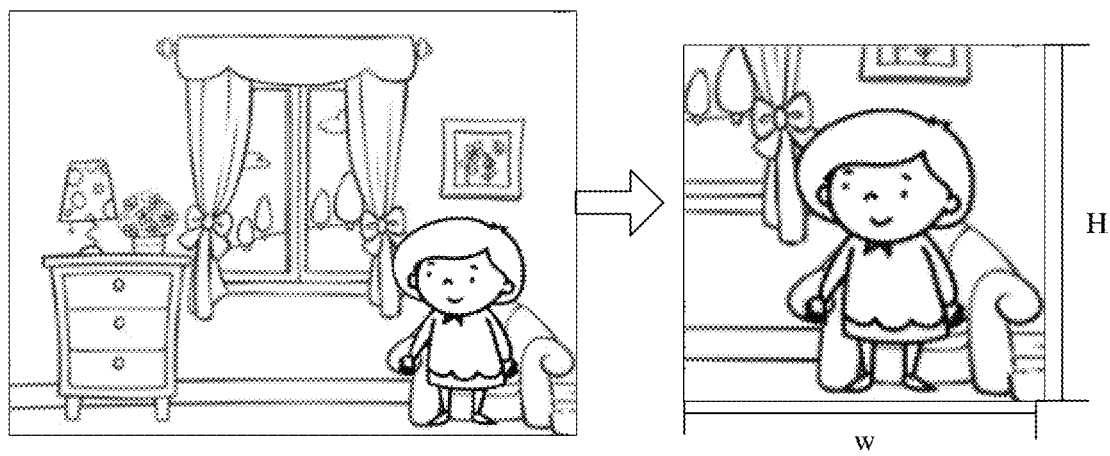
FIG. 24(a) and FIG. 24(b) are schematic diagrams of video image processing of another surveillance scenario according to an embodiment of this application.

At another moment in the running process of the surveillance system, a location of a subject in a collection scenario changes. In this case, a video image of a fixed field of view collected by the camera 1 is shown in FIG. 24(a), and the camera 1 sends the collected image to the server 2. The server 2 processes the collected image based on the video image processing method provided in the embodiments of this application, determines a main subject, and crops and scales the collected image into an image of the display specification of the display device 3, as shown in FIG. 24(b). The server 2 displays the image shown in FIG. 24(b) in real time by using the display device 3. In addition, the server 2 stores the image shown in FIG. 24(b) in the storage apparatus of the server 2. When receiving an instruction for reading the video image, the server 2 reads the video image from the storage apparatus and displays the video image by using the display device 3.

Figure 25A:
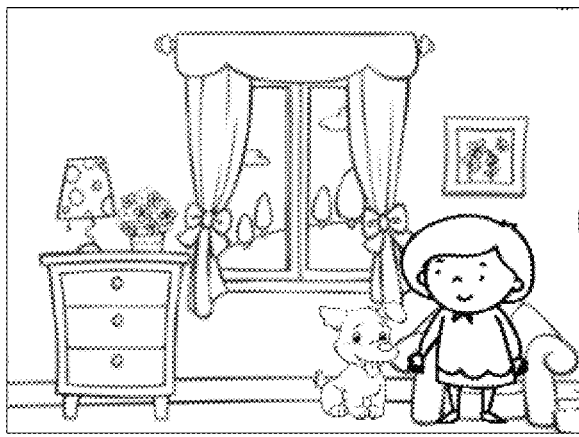
FIG. 25(a) and FIG. 25(b) are schematic diagrams of video image processing of still another surveillance scenario according to an embodiment of this application.
Figure 25B:
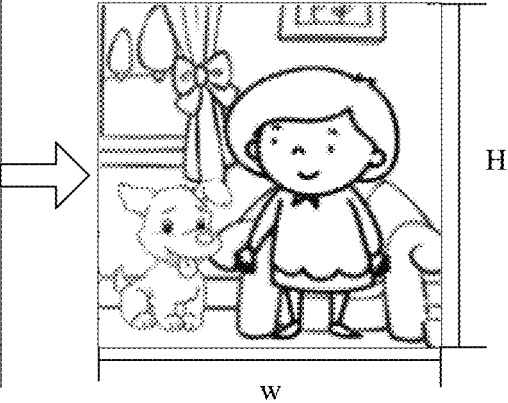

At another moment in the running process of the surveillance system, a subject is bigger in a collection scenario. In this case, a video image of a fixed field of view collected by the camera 1 is shown in FIG. 25(a), and the camera 1 sends the collected image to the server 2. The server 2 processes the collected image based on the video image processing method provided in the embodiments of this application, determines a main subject, and crops and scales the collected image into an image of the display specification of the display device 3, as shown in FIG. 25(b). The server 2 displays the image shown in FIG. 25(b) in real time by using the display device 3. In addition, the server 2 stores the image shown in FIG. 25(b) in the storage apparatus of the server 2. When receiving an instruction for reading the video image, the server 2 reads the video image from the storage apparatus and displays the video image by using the display device 3.

Figure 26A:
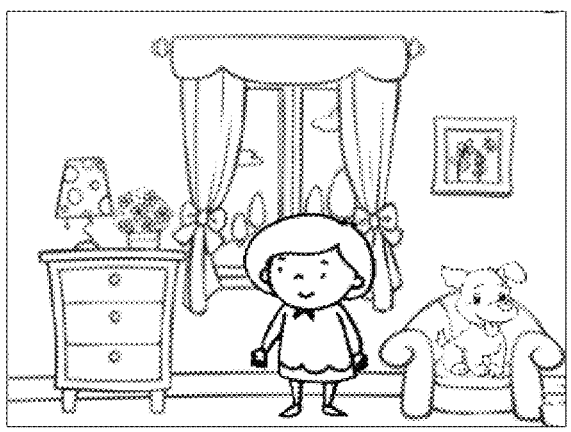
FIG. 26(a) and FIG. 26(b) are schematic diagrams of video image processing of still another surveillance scenario according to an embodiment of this application.
Figure 26B:
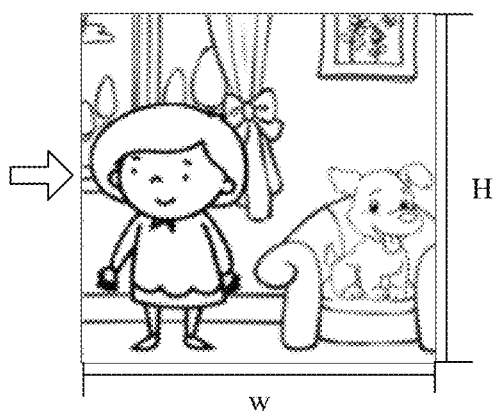

At another moment in the running process of the surveillance system, in a collection scenario, the subject is bigger and the location of the subject changes. In this case, a video image of a fixed field of view collected by the camera 1 is shown in FIG. 26(a), and the camera 1 sends the collected image to the server 2. The server 2 processes the collected image based on the video image processing method provided in the embodiments of this application, determines a main subject, and crops and scales the collected image into an image of the display specification of the display device 3, as shown in FIG. 26(b). The server 2 displays the image shown in FIG. 26(b) in real time by using the display device 3. In addition, the server 2 stores the image shown in FIG. 26(b) in the storage apparatus of the server 2. When receiving an instruction for reading the video image, the server 2 reads the video image from the storage apparatus and displays the video image by using the display device 3.

The foregoing mainly describes, from the perspective of the electronic device, the solutions provided in the embodiments of this application. It may be understood that, to implement the foregoing functions, the electronic device includes corresponding hardware structures and/or software modules for performing the functions. A person skilled in the art should easily be aware that, in combination with the examples described in the embodiments disclosed in this specification, this application may be implemented by hardware or a combination of hardware and computer software. Whether a specific function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the electronic device may be divided into functional modules according to the example in the foregoing method. For example, functional modules may be divided by function, or two or more functions may be integrated into one processing module. The integrated module may be implemented in a form of hardware, or may be implemented in a form of a software functional module. It should be noted that, in this embodiment of this application, division into the modules is an example, and is merely a logical function division. In actual implementation, another division manner may be used.

Figure 27:
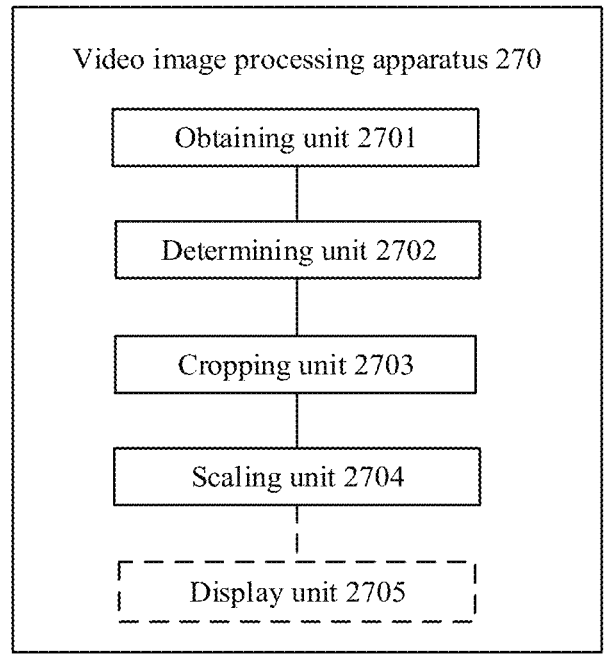
FIG. 27 is a schematic diagram of a structure of a video image processing apparatus according to an embodiment of this application.

When functional modules are divided by using corresponding functions, FIG. 27 shows a video image processing apparatus 270 according to an embodiment of this application. The video image processing apparatus 270 is configured to implement functions of the electronic device in the foregoing method. The video image processing apparatus 270 may be an electronic device, may be an apparatus in an electronic device, or may be an apparatus that can match with an electronic device for use. The video image processing apparatus 270 may be a chip system. In this embodiment of this application, the chip system may include a chip, or may include a chip and another discrete device. As shown in FIG. 27, the video image processing apparatus 270 may include: an obtaining unit 2701, a determining unit 2702, a cropping unit 2703, and a scaling unit 2704. The obtaining unit 2701 is configured to perform S901 and S901a in FIG. 9 or FIG. 16, the determining unit 2702 is configured to perform S902 in FIG. 9 or FIG. 16, the cropping unit 2703 is configured to perform S903 in FIG. 9 or FIG. 16, and the scaling unit 2704 is configured to perform S904 in FIG. 9 or FIG. 16. All related content of the steps in the foregoing method embodiments may be cited in function descriptions of corresponding functional modules. Details are not described herein again.

Further, as shown in FIG. 27, the video image processing apparatus 270 may further include a display unit 2705, configured to perform S905 in FIG. 16.

Figure 28:
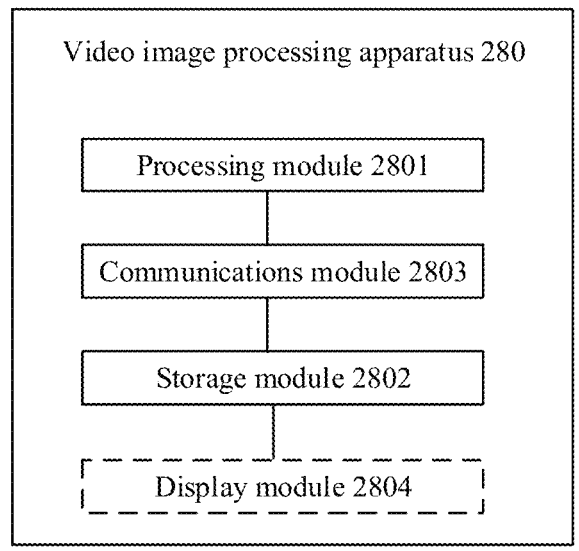
FIG. 28 is a schematic diagram of a structure of another video image processing apparatus according to an embodiment of this application.

FIG. 28 shows a video image processing apparatus 280 according to an embodiment of this application. The video image processing apparatus 280 is configured to implement functions of the electronic device in the foregoing method. The video image processing apparatus 280 may be an electronic device, may be an apparatus in an electronic device, or may be an apparatus that can match with an electronic device for use. The video image processing apparatus 280 may be a chip system. The video image processing apparatus 280 includes at least one processing module 2801, configured to implement the functions of the electronic device in the method provided in the embodiments of this application. For example, the processing module 2801 may be configured to perform processes S901, S901a, S902, S903, and S904 in FIG. 9 or FIG. 16. For details, refer to detailed descriptions in the method examples. Details are not described herein again.

The video image processing apparatus 280 may further include at least one storage module 2802, configured to store program instructions and/or data. The storage module 2802 is coupled to the processing module 2801. Coupling in this embodiment of this application is an indirect coupling or a communication connection between apparatuses, units, or modules, may be in an electrical form, a mechanical form, or another form, and is used for information exchange between the apparatuses, the units, or the modules. The processing module 2801 may cooperate with the storage module 2802. The processing module 2801 may execute the program instructions stored in the storage module 2802. At least one of the at least one storage module may be included in the processing module.

The video image processing apparatus 280 may further include a communications module 2803, configured to communicate with another device by using a transmission medium, so as to determine that an apparatus in the video image processing apparatus 280 may communicate with the other device.

The video image processing apparatus 280 may further include a display module 2804, configured to perform the process S905 in FIG. 16.

When the processing module 2801 is a processor, the storage module 2802 is a memory, and the display module 2804 is a display, the video image processing apparatus 280 in FIG. 28 in this embodiment of this application may be the electronic device shown in FIG. 8.

As described above, the video image processing apparatus 270 or the video image processing apparatus 280 provided in the embodiments of this application may be configured to implement the functions of the electronic device in the methods implemented in the foregoing embodiments of this application. For ease of description, only a part related to this embodiment of this application is shown. For specific technical details that are not disclosed, refer to the embodiments of this application.

According to some other embodiments of this application, a computer-readable storage medium is further provided. The computer-readable storage medium may include computer software instructions. When the computer software instructions are run on an electronic device, the electronic device is enabled to perform the steps performed by the electronic device in the embodiments shown in FIG. 9 or FIG. 16.

According to some other embodiments of this application, a computer program product is further provided. When the computer program product runs on a computer, the computer is enabled to perform the steps performed by the electronic device in the embodiments shown in FIG. 9 or FIG. 16.

According to some other embodiments of this application, a chip system is further provided. The chip system may be applied to an electronic device. The electronic device includes a display and a camera. The chip system includes an interface circuit and a processor. The interface circuit and the processor are interconnected through a line. The interface circuit is configured to receive a signal from a memory of the electronic device, and send the signal to the processor. The signal includes computer instructions stored in the memory. When the processor executes the computer instructions, the chip system performs the steps performed by the electronic device in the embodiments shown in FIG. 9 or FIG. 16.

The foregoing descriptions about the implementations allow a person skilled in the art to clearly understand that, for ease and brevity of description, division of the foregoing functional modules is used as an example for illustration. In actual application, the foregoing functions can be allocated to different functional modules and implemented based on a requirement, that is, an inner structure of an apparatus is divided into different functional modules to implement all or some of the functions described above.

In the several embodiments provided in this application, it should be understood that the disclosed apparatus and method may be implemented in another manner. For example, the described apparatus embodiments are merely examples. For example, division into the modules or units is merely logical function division. There may be another division manner in actual implementation. For example, a plurality of units or components may be combined or may be integrated into another apparatus, or some features may be ignored or not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software function unit and sold or used as an independent product, the integrated unit may be stored in a readable storage medium. Based on such an understanding, the technical solutions in the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes various media that can store program code, such as a USB flash drive, a removable hard disk, a read-only memory (ROM), a random access memory (RAM), a magnetic disk, and an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A video image processing method comprising:
   obtaining identity information and location information of each subject of a plurality of subjects in an $i^{th}$ video image frame, wherein i is greater than 1;
   determining M main subjects from the $i^{th}$ video image frame based on identity information of each subject in N video image frames before the $i^{th}$ video image frame, wherein M and N are greater than or equal to 1, and the identity information of each subject in the N video image frames comprises identity information of the M main subjects;
   cropping the $i^{th}$ video image frame based on location information of the main subjects, wherein a cropped $i^{th}$ video image frame comprises the M main subjects; and
   scaling down or scaling up the cropped $i^{th}$ video image frame, so that a display displays the cropped $i^{th}$ video image frame based on a preset display specification.

2. The method according to claim 1, wherein determining the M main subjects comprises:
   determining that a subject of the plurality of subjects is one of the M main subjects by determining that among the N video image frames a quantity of image frames comprising the subject is greater than or equal to a first preset threshold.

3. The method according to claim 1, wherein
   the method further comprises: dividing the $i^{th}$ video image frame into Y areas, and configuring a preset threshold corresponding to each of the Y areas, wherein a preset threshold corresponding to a $k^{th}$ area of the Y areas is a $k^{th}$ preset threshold, the $k^{th}$ area is any area in the Y areas, Y is greater than or equal to 2, and k is greater than or equal to 1 and less than or equal to Y; and
   determining the M main subjects comprises:
   determining that a subject of the plurality of subjects is one of the M main subjects by determining that among the N video image frames a quantity of video image frames comprising the subject is greater than or equal to the preset thresholds corresponding to areas in which the subject is located.

4. The method according to claim 1, wherein
   the method further comprises: obtaining subject information of each subject of the plurality of subjects in the $i^{th}$ video image frame, wherein the subject information comprises one or more of the following information: for each subject, information about whether that subject speaks, or priority information; and
   determining the M main subjects comprises:
   determining a subject of the plurality of subjects in the $i^{th}$ video image frame is one of the M main subjects by determining that among the N video image frames a quantity of video image frames comprising the subject speaking is greater than or equal to a second preset threshold;
   determining that the subject of the plurality of subjects in the $i^{th}$ video image frame is one of the M main subjects by determining that among the N video image frames priority information of the subject is greater than a third preset threshold; or
   selecting, based on priority information of each of the plurality of subjects, the most important M subjects, from the plurality of subjects in the $i^{th}$ video image frame, the subject of the plurality of subjects as one of the M main subjects by determining that among the N video image frames, a quantity of video image frames comprising the subject speaking is greater than or equal to the second preset threshold.

5. The method according to claim 1, wherein cropping the $i^{th}$ video image frame comprises:
   determining a cropping box comprising a minimum external rectangular frame of the M main subjects; and
   cropping the $i^{th}$ video image frame by using the cropping box.

6. The method according to claim 5, wherein determining the cropping box comprises:
   obtaining a distance between a center point of a first to-be-selected cropping box and a center point of a cropping box of a previous video image frame, wherein the first to-be-selected cropping box comprises the minimum external rectangular frame of the M main subjects;

if the distance is greater than or equal to a distance threshold, determining a second cropping box, wherein a center point of the second cropping box is the center point of the cropping box of the previous video image frame plus an offset, and a size of the second cropping box is the same as a size of the cropping box of the previous video image frame; and if the second cropping box comprises the minimum external rectangular frame, using a third cropping box as the cropping box, wherein the third cropping box is the second cropping box, or the third cropping box is a cropping box obtained by narrowing the second cropping box to comprise the minimum external rectangular frame; or if the second cropping box does not completely comprise the minimum external rectangular frame, enlarging the second cropping box to comprise the minimum external rectangular frame, and using an enlarged second cropping box as the cropping box.

7. The method according to claim 1, further comprising: displaying the cropped $i^{th}$ video image frame based on the preset display specification.

8. An electronic device comprising:
a processor coupled to a memory storing computer program code comprising computer instructions, and when the computer instructions are executed by the electronic device, the electronic device is enabled to perform the video image processing method according to claim 1.

9. A non-transitory computer-readable storage medium comprising: computer software instructions, wherein when the computer software instructions are run in an electronic device, the electronic device 19 enabled to perform the video image processing method according to claim 1.

10. A computer program product, wherein when the computer program product runs on a computer, the computer is enabled to perform the video image processing method according to claim 1.

11. A video image processing apparatus comprising:
an obtaining unit, configured to obtain identity information and location information of each subject of a plurality of subjects in an $i^{th}$ video image frame, wherein i is greater than 1;
a determining unit, configured to determine M main subjects from the $i^{th}$ video image frame based on identity information of each subject in N video image frames before the $i^{th}$ video image frame, wherein M and N are greater than or equal to 1;
a cropping unit, configured to crop the $i^{th}$ video image frame based on location information that is of the main subjects and that is determined by the determining unit, wherein a cropped $i^{th}$ video image frame comprises the M main subjects, and the identity information of each subject in the N video image frames comprises identity information of the M main subjects; and
a scaling unit, configured to scale down or scale up the cropped $i^{th}$ video image frame, so that a display displays the cropped $i^{th}$ video image frame based on a preset display specification.

12. The apparatus according to claim 11, wherein the determining unit is configured to:
determine that a subject of the plurality of subjects is one of the M main subjects by determining that among the N video image frames a quantity of image frames comprising the subject is greater than or equal to a first preset threshold.

13. The apparatus according to claim 11, wherein the determining unit is specifically configured to:
divide the $i^{th}$ video image frame into Y areas, and configure a preset threshold corresponding to each of the Y areas, wherein a preset threshold corresponding to a $k^{th}$ area of the Y areas is a $k^{th}$ preset threshold, the $k^{th}$ area is any area in the Y areas, Y is greater than or equal to 2, and k is greater than or equal to 1 and less than or equal to Y; and
determine a subject of the plurality of subjects is one of the M main subjects by determining that among the N video image frames a quantity of video image frames comprising the subject is greater than or equal to the preset thresholds corresponding to areas in which the subject is located.

14. The apparatus according to claim 11, wherein
the obtaining unit is further configured to: obtain subject information of each subject of the plurality of subjects, wherein the subject information comprises one or more of the following information: for each subject, information about whether that subject speaks and priority information; and
the determining unit is specifically configured to:
determine a subject of the plurality of subjects in the $i^{th}$ video image frame is one of the M main subjects by determining that among the N video image frames a quantity of video image frames comprising the subject speaking is greater than or equal to a second preset threshold;
determine that the subject of the plurality of subjects in the $i^{th}$ video image frame is one of the M main subjects by determining that among the N video image frames priority information of the subject is greater than a third preset threshold; or
select, based on the priority information of each of the plurality of subjects, the most important M subjects, from the plurality of subjects in the $i^{th}$ video image frame, the subject of the plurality of subjects as one of the M main subjects by determining that among the N video image frames, a quantity of video image frames comprising the subject speaking is greater than or equal to the second preset threshold.

15. The apparatus according to claim 11, wherein the cropping unit is specifically configured to:
determine a cropping box comprising a minimum external rectangular frame of the M main subjects; and
crop the $i^{th}$ video image frame by using the cropping box.

16. The apparatus according to claim 15, wherein the cropping unit is specifically configured to:
obtain a distance between a center point of a first to-be-selected cropping box and a center point of a cropping box of a previous video image frame, wherein the first to-be-selected cropping box comprises the minimum external rectangular frame of the M main subjects;
if the distance is greater than or equal to a distance threshold, determine a second cropping box, wherein a center point of the second cropping box is the center point of the cropping box of the previous video image frame plus an offset, and a size of the second cropping box is the same as a size of the cropping box of the previous video image frame; and
if the second cropping box comprises the minimum external rectangular frame, use a third cropping box as the cropping box, wherein the third cropping box is the second cropping box, or the third cropping box is a cropping box obtained by narrowing the second cropping box to comprise the minimum external rectangular frame; or if the second cropping box does not completely comprise the minimum external rectangular frame, enlarge the second cropping box to comprise the minimum external rectangular frame, and use an enlarged second cropping box as the cropping box.

17. The apparatus according to claim 11, wherein the apparatus further comprises:

a display unit, configured to display the cropped $i^{th}$ video image frame based on the preset display specification.

* * * * *